United States Patent
Han et al.

[11] Patent Number: 5,820,135
[45] Date of Patent: Oct. 13, 1998

[54] COUNTER CENTRIFUGAL CHUCK AND MOUNTING SYSTEMS

[75] Inventors: Erik G. Han, Anderson; Roger J. Kanaan, Easley, both of S.C.

[73] Assignee: Power Tool Holders Incorporated, Wilmington, Del.

[21] Appl. No.: 668,562

[22] Filed: Jun. 20, 1996

Related U.S. Application Data

[60] Provisional application No. 60/012,604 Mar. 1, 1996.

[51] Int. Cl.⁶ ..................................................... B23B 31/14
[52] U.S. Cl. .......................... 279/131; 279/22; 279/46.4; 279/54; 279/75
[58] Field of Search ............................... 279/22, 23.1, 24, 279/30, 129, 131, 66, 67–75, 46.4, 46.1, 46.2, 54, 55

[56] References Cited

U.S. PATENT DOCUMENTS

| | | | |
|---|---|---|---|
| 2,926,020 | 2/1960 | Dayton et al. | 279/22 |
| 3,411,796 | 11/1968 | Decker | 279/46.4 |
| 3,467,404 | 9/1969 | Sloan | 279/131 |
| 3,521,895 | 7/1970 | Smith | 279/22 |
| 3,573,876 | 4/1971 | Powell | 279/131 |
| 3,692,319 | 9/1972 | Taylor | 279/131 |
| 3,709,508 | 1/1973 | Dudley | 279/131 |
| 3,837,661 | 9/1974 | Phillippi | 279/131 |
| 4,017,203 | 4/1977 | Marantette et al. | 279/131 |
| 4,946,179 | 8/1990 | De Bastiani et al. | 279/22 |
| 5,193,824 | 3/1993 | Salpaka | 279/60 |
| 5,464,229 | 11/1995 | Salpaka | 279/30 |

*Primary Examiner*—Steven C. Bishop
*Attorney, Agent, or Firm*—Dority & Manning

[57] ABSTRACT

The chuck includes a body with an axial recess and a transverse opening intersecting the recess. First and second cam members are disposed at least partially within the transverse opening and have first and second passages, respectively, which squeeze a cylindrical, slitted inner sleeve that holds the tool shank during rotation of the chuck. The inner sleeve is spring-biased for axial movement relative to the body and has a tapered upper end that is compressed when engaging a tapered retainer sleeve and thereby retains the tool shank during nonrotation of the chuck.

An outer sleeve including comolded inner and outer shells, is configured and disposed to move axially about the body. A remote actuating member effects axial movement of the outer sleeve and inner sleeves to permit insertion or withdrawal of the tool shank from the chuck.

An engagement mechanism connects the chuck to a drive spindle and also has a mounting mechanism for facilitating automated mounting of the chuck to a drive spindle.

35 Claims, 17 Drawing Sheets

COUNTER CENTRIFUGAL CHUCK AND MOUNTING SYSTEMS

BACKGROUND OF THE INVENTION

This is a continuation-in-part application to co-pending provisional application Ser. No. 60/012,604, filed Mar. 1, 1996, which is hereby incorporated herein by this reference.

The present invention relates to a quick-change chuck device that can be attached to a drive spindle of a machine tool and used for holding power bits or tools that are worked by the machine tool.

Any collet or chuck device utilized for holding a power bit, for example a router bit, to a drive spindle must lock the power bit both axially and radially with respect to the drive spindle. In other words, the power bit cannot rotate relative to the drive spindle or be moved axially in and out relative thereto. This concern is especially important with high speed machine tools, such as routers, both for accuracy and safety considerations. With conventional systems, one relatively simple means for rotationally securing the tool bit consists of defining a hexagonal or other multi-sided profile on the end of the tool bit which fits into a corresponding multi-sided recess formed in the chuck device. It is common for the operator to need to use either two wrenches or a wrench and a spindle lock in order to change a router bit.

With another solution, collet chucks utilize a compressible collet for axially and rotationally holding the tool bit. Collet chucks are useful in that they do not depend on a multi-sided configuration in the tool bit for holding the tool. Thus, any manner of power bits or tool bits having essentially round shank portions may be held by a collet chuck device. However, collet chuck devices do not have the quick-change or quick release capabilities that are desired in many applications. For example, it is highly desirable for portable tools such as routers or laminate trimmers to utilize quick-release chuck devices for relatively quick and easy change out of tool bits. However, with the conventional quick-release devices, the tool shank portions must be multi-sided to fit within corresponding bores defined in the quick-change chuck devices. It would be desirable in the art to have a quick-change chuck device which can be utilized with any manner of tool bit, including tool bits that have essentially round tool shanks, for increasing the versatility and ease of operation of machine tools utilizing such chuck devices. It also would be desirable to have a quick-change chuck device that could be automatically mounted and unmounted by machine.

Various devices are known in the art for use on portable stationary routers, laminate trimmers, drywall cutters, etc., for securing or holding power tools or power bits to a spindle of the machine tool. For example, various collet tool holding devices and quick release adapters are known in the art. U.S. Pat. No. 5,301,961 to Wozar describes one such chuck. Likewise, U.S. Pat. No. 4,692,073 to Martindell describes a chuck apparatus utilizing a spring-biased sleeve disposed about the drive spindle for axially securing the power bit to the chuck apparatus.

Moreover, components of the chuck and the shank of the tool bit can become deformed together and so make it difficult to release the shank from the chuck and withdraw the tool bit. It would be desirable to have a quick-change chuck device that overcomes such problems.

In router chucks (and other chucks designed for the high rpm environment), small eccentricities in alignment and in the configuration of the body of the chuck can create large moments resulting in poor and inaccurate routing. Thus, highly specialized systems for mounting such chucks to the spindles of machine tools are typically deemed necessary, while conventional mounting systems for routers are deemed inadequate. Such more elaborate mounting systems are more expensive to manufacture and assemble and are less well received in the work environment because of their added complexity.

OBJECTS AND SUMMARY OF THE INVENTION

Therefore a principal object of the present invention is to provide a quick-change chuck device for securing a tool bit or working device to a driven spindle of a machine tool.

Another object of the present invention is to provide a quick-change chuck device that uses the centrifugal forces generated by the rotating chuck to hold the shank of the tool bit in the chuck device.

Still another object of the present invention is to provide a quick-change chuck device that can be mounted to and unmounted from a machine tool by automated machine means.

A further object of the invention is to provide a versatile quick-change chuck device which is capable of holding tool bits having round tool shanks.

A yet further object of the present invention is to provide a fast-acting, quick-change chuck device in which a tool bit can be readily inserted and removed without having to align a multi-sided profile of the tool with a multi-sided bore in the chuck device.

Yet another object of the present invention is to provide a quick-change chuck device that overcomes lock-up of tool bits inside the chuck device.

Still another object of the present invention is to provide a quick-change chuck device that reduces any tendency of the chuck device to mark the shank of the tool.

A yet further object of the present invention is to provide a quick-change chuck device that can be used in high rpm environments without the need for more elaborate mounting systems that are more expensive to manufacture and assemble and are less well received in the work environment because of their added complexity.

A still further object of the present invention is to provide a quick-change chuck device that can be used in high rpm environments yet is composed of components that are relatively easy to make and assemble, while the chuck is compatible with relatively less complex mounting systems.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the chuck includes a body member in which there is defined an axial recess and a transverse opening that intersects the axial recess. First and second cam members are disposed at least partially within the transverse opening and have first and second passages, respectively, that can be disposed concentrically with the axial recess. An inner sleeve member is disposed within the axial recess and defines an axially extending bore therein and concentric with the axial recess of the body member.

In preferred embodiments, the inner sleeve is disposed through the first and second passages and further defines at least a first slit that extends axially therethrough from the upper end of the inner sleeve to the lower end of the inner sleeve. The inner sleeve also defines at least a second axially extending slit that extends therethrough from the lower end toward the upper end and in a manner generally spaced apart from and parallel to the first slit. A plurality of first slits and second slits are desirably disposed symmetrically and alternately about the circumference of the inner sleeve. The first and second slits cooperate to render the inner sleeve flexible both diametrically and circumferentially so as to permit both expansion and contraction of the diameter and the circumference of the inner sleeve's axial bore upon the application of the appropriately directed forces.

When the chuck device is in use holding a shank of a tool bit and rotating during use of the tool bit, the first cam and the second cam are forced from their rest positions to their gripping positions. In particular, when the chuck is rotating, centrifugal force acts to pull the first and second cams radially away from one another and away from the central axis of the body member. In doing so, the first passage and the second passage become nonconcentric relative to the axial recess. As this occurs, the first and second fingers of the cams apply pressure to radially compress the inner sleeve around the tool shank disposed within the axial bore of the inner sleeve. The gripping force exerted by the compressed inner sleeve suffices to retain the shank of the tool in place within the axial bore of the inner sleeve while the chuck is rotating during use of the tool under load. In an alternative embodiment, the first and second fingers apply the inwardly directed radial forces directly to the shank of the tool disposed within the axial recess of the body member.

The centrifugal chuck device of the present invention also has means for holding the shank of the tool bit in the chuck while the chuck is not rotating in its operative state. In a presently preferred embodiment, the tool shank static holding means includes a tapered surface formed on the exterior surface of the upper end of the inner sleeve. In addition, the tool shank static holding means includes a retainer sleeve, which in the presently preferred embodiment includes a tapered interior surface that is disposed to oppose the tapered exterior surface of the inner sleeve. An axial spring mechanism biases the inner sleeve axially relative to the body member and against the tapered interior surface of the retainer sleeve with sufficient force so as to compress the tapered upper end of the inner sleeve radially inward to reduce the diameter of its axial bore sufficiently to grip the shank of a tool inserted therein.

In a presently preferred embodiment of the chuck device, a supplemental tightening mechanism is provided by tapering the outer surface of the inner sleeve and the surfaces that define the first and second passages of the first and second cams. Thus, the faster the chuck device rotates, the greater the centrifugal force acting radially on the cams. Radial movement of the cams causes their tapered passage surfaces to squeeze the tapered exterior surface of the inner sleeve axially toward the tapered interior surface of the retainer sleeve. This causes ever greater compressive forces to bear against tapered exterior surface of the upper end of the inner sleeve member. These increasing compressive forces act to further reduce the diameter of the axial bore of the inner sleeve and thus further tightens the grip of the chuck device about the shank of any tool inserted therein.

An alternative embodiment of the tool shank static holding means relies on gripping elements constrained within collar openings formed in the inner sleeve. The collar openings are conically tapering, and the gripping elements are disposed within the collar openings in a manner whereby the gripping elements can be disposed to project into the axial bore up to a predetermined extent and thereby retain the shank of a tool bit residing within the axial bore of the inner sleeve. The body member defines a first tapered pocket in the vicinity of the collar openings of the inner sleeve whereby up or down axial movement of the inner sleeve relative to the body member permits the gripping elements to move radially toward or away from the central axis of the axial bore of the inner sleeve. Much like the inner sleeve, the retainer sleeve, which defines an axial channel, can be provided with conically tapering collar openings defined therein and in receipt of gripping elements that can be disposed to project into the axial channel up to a predetermined extent and thereby retain the shank of a tool bit residing within the axial channel of the retainer sleeve. The body member defines a second tapered pocket in the vicinity of the collar openings of the retainer sleeve whereby up or down axial movement of the retainer sleeve relative to the body member permits the gripping elements to move radially toward or away from the central axis of the axial channel of the retainer sleeve.

The gripping elements exert sufficient force to retain the shank of the tool in place within the axial bore of the inner sleeve and the axial channel of the retainer sleeve while the chuck is at rest in a nonrotating state.

In presently preferred embodiments, an outer sleeve, which can be formed of an inner shell and an outer shell comolded over the inner shell, is disposed about the body member. The outer sleeve also is configured and disposed to move axially together with a cover mounting sleeve, which has one end disposed in opposition to the upper end of the inner sleeve, or with the retainer sleeve. Moreover, a remote actuating member is provided with one end connected to the outer sleeve and is configured and disposed so that movement of the remote end of the remote actuating member effects axial movement of the outer sleeve. This in turn moves the cover mounting sleeve (or retainer sleeve) axially and thereby permits insertion or withdrawal of the tool shank into or from the axial bore of the inner sleeve.

An engagement mechanism is provided for operably connecting both the above-described chuck body as well as any other chuck body, to a drive spindle. The engagement mechanism can include a female threaded receiving portion at an end of the body member for threaded engagement with a male threaded driving spindle. Alternatively, the engagement mechanism can include a male threaded engaging portion at an end of the body member for threaded engagement with a female threaded receiving portion of a driving spindle. Alternatively, the engagement mechanism can include a tapered female unthreaded receiving portion at an end of the body member and configured for engagement with a male tapered mount at the end of a driving spindle. The engagement mechanism also can include a mounting mechanism for facilitating automated mounting of the chuck device to a driving spindle, preferably via the body member of the chuck device. The mounting mechanism can include at least one of the group consisting of an opening configured for receiving a retaining screw, a torx head tool, an Allen head tool, and a square head tool.

The accompanying drawings, which are incorporated in and constitute a part of this specification, illustrate one embodiment of the invention and, together with the description, serve to explain the principles of the invention.

DETAILED DESCRIPTION OF THE PREFERRED EMBODIMENTS

Reference now will be made in detail to the presently preferred embodiments of the invention, one or more examples of which are illustrated in the accompanying drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. The same numerals are assigned to the same components throughout the drawings and description. In addition, comparable elements of different embodiments are designated by numerals that differ numerically by a factor of 100.

A preferred embodiment of the quick-change chuck device of the present invention is shown in FIGS. 3 and 8–10 in the form of a counter centrifugal chuck. An alternative embodiment of a counter centrifugal chuck of the present invention is shown in FIGS. 1–8. Another alternative embodiment of a counter centrifugal chuck of the present invention is shown in FIGS. 15–19. The quick-change, counter centrifugal chuck device of the present invention is represented generally in the Figs. by the numerals 110, 210, 310 depending on the particular embodiment. As shown in phantom (dashed line) in FIGS. 1 and 15, the counter centrifugal chuck device of the present invention can be used to hold the shank 23, 323 of a tool such as a router bit 27, 327.

Figure 1:
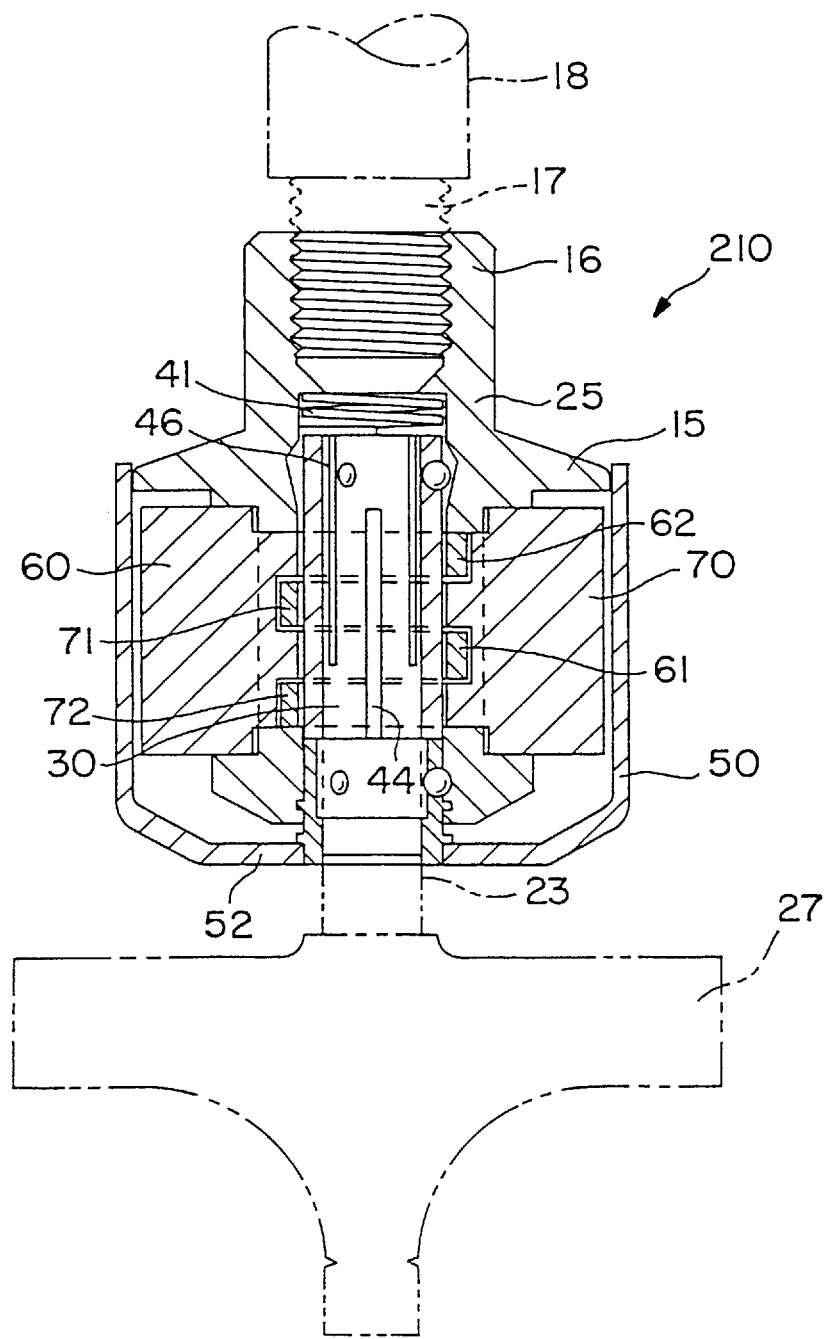
FIG. 1 is an axial cross-sectional view of an alternative embodiment of the chuck device of the present invention locked about the shaft of a tool bit, which is shown in phantom along with a drive spindle.
Figure 9:
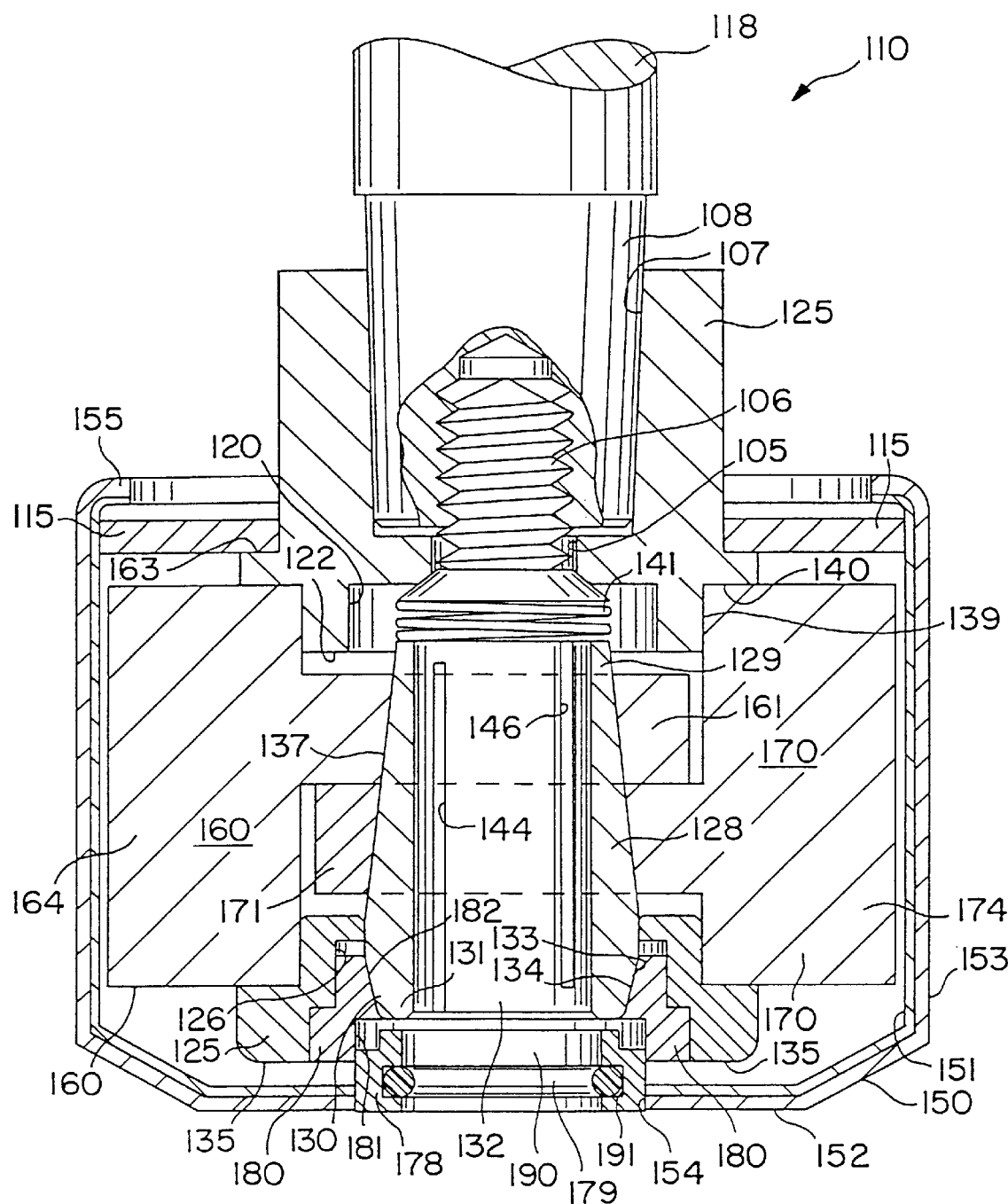
FIG. 9 is an axial cross-sectional view of a presently preferred embodiment of the chuck device of the present invention engaged with the drive spindle (shown partially broken away) of a machine tool.
Figure 15:
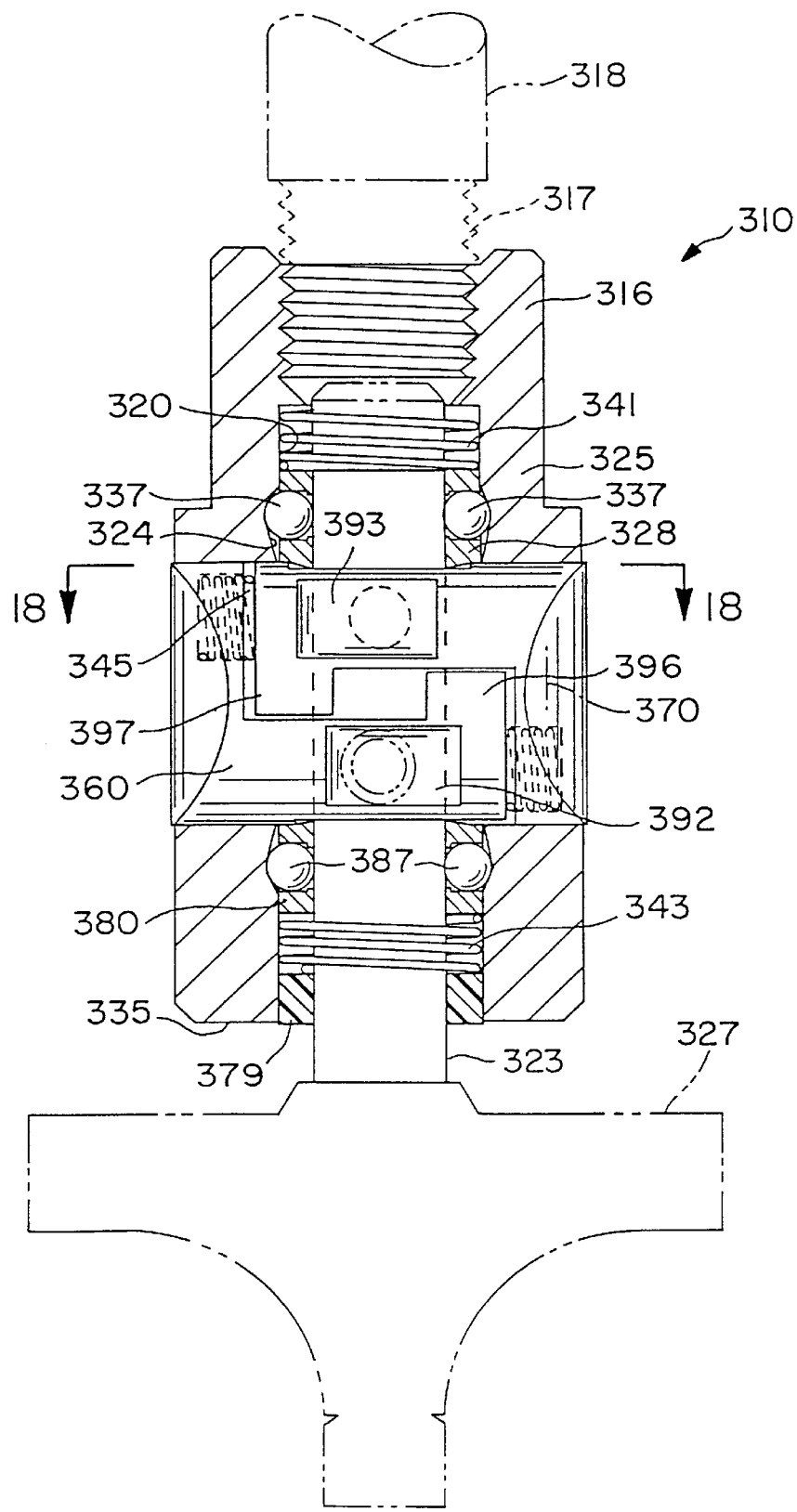
FIG. 15 is an axial cross-sectional view of a second alternative embodiment of the chuck device of the present invention locked about the shaft of a tool bit, which is shown in phantom along with a drive spindle.

The counter centrifugal chuck device of the present invention includes a body member that has a front end disposed opposite a rear end. The front end is disposed toward the tool to be received by the chuck. The rear end is disposed toward the drive spindle of the machine that powers the tool. As shown in FIGS. 1, 9, and 15 for example, a body member 25, 125, 325 is configured to be driven by a drive spindle 18, 118, 318 (shown in dashed line in FIGS. 1 and 15).

Figure 10:
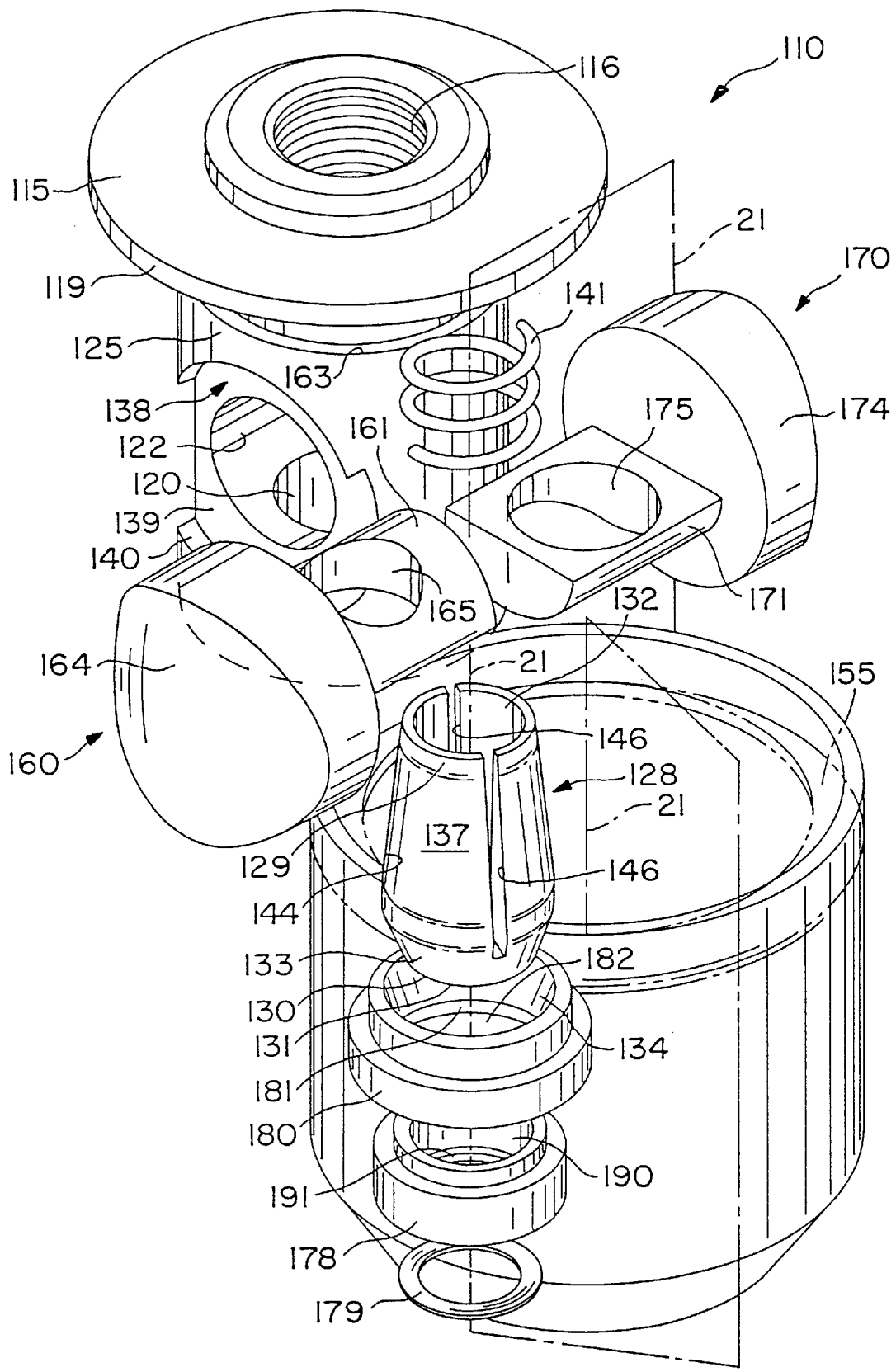
FIG. 10 is an elevated perspective assembly view of the chuck device shown in FIG. 9.

In accordance with the present invention, the body member includes a recess that is axially defined within the body member. This so-called axial recess is configured for receipt of the shank of a tool, either directly or with an inner sleeve member interposed between the shank and the axial recess. Such an inner sleeve member preferably is shaped with a cylindrical exterior surface. As shown in FIGS. 9 and 10 for example, an axial recess 120 is defined within body member 125 so as to elongate in the axial direction relative to body member 125. Similarly, as shown in FIGS. 2, 4, 5 and 16 for example, an axial recess 20, 320 is disposed axially of body member 25, 325. Axial recess 120, 20, 320 has a circular transverse cross-section and is disposed symmetrically about a central longitudinal axis 21 of body member 125, 25, 325, as respectively shown in FIGS. 10, 2 and 16 for example.

In accordance with the present invention, the body member includes a transverse opening, which is disposed across the axial recess and intersecting the central longitudinal axis of the axial recess. As shown in FIGS. 9 and 10 for example, body member 125 further defines a transverse opening 122, which is defined completely through body member 125 and disposed transversely relative to axial recess 120. In a similar fashion shown in FIGS. 2, 4, 5, 16 and 17 for example, body member 25, 325 defines a transverse opening 22, 322, which is defined completely through body member 25, 325 and disposed transversely relative to axial recess 20, 320. Though the central longitudinal axis of transverse opening 122, 22, 322 is shown disposed across axial recess 120, 20, 320 at a right angle to the central longitudinal axis 21 of body member 125, 25, 325 in FIGS. 10, 2 and 16 for example, this angle of intersection can be less than 90 degrees. However, at angles of intersection less than 90 degrees, the transverse component of the gripping force provided by the centrifugal force acting on cam members (e.g., 60, 70 described below) becomes less than the maximum potential gripping force at any given number of revolutions per second of the chuck device 110, 210, 310.

The present invention provides a distinct advantage in that, due to the unique configuration of the body member, a wide variety and manner of engagement mechanisms or devices can be used to operably connect the chuck device to a drive spindle, particularly in relatively high rpm applications such as chuck devices intended to hold router tool bits wherein it has been conventionally believed that relatively sophisticated and complicated engagement devices were necessary. Because the design of the present invention includes a transverse opening through the body member, a relatively greater proportion of the mass of the body member is disposed near the section of the body member that engages the drive spindle. This disposition of a greater proportion of the mass of the body about the drive spindle, works to reduce the magnitude of undesirable moments that might result from eccentricities in alignment between the chuck and the spindle and in the configuration of the body of the chuck. Accordingly, a wider variety of configurations of the engagement mechanism may be utilized to mate drive spindles with chuck devices of the present invention. This larger universe of engagement mechanisms includes those tending to be less complex and having components that are relatively easier to machine and assemble.

Figure 11:
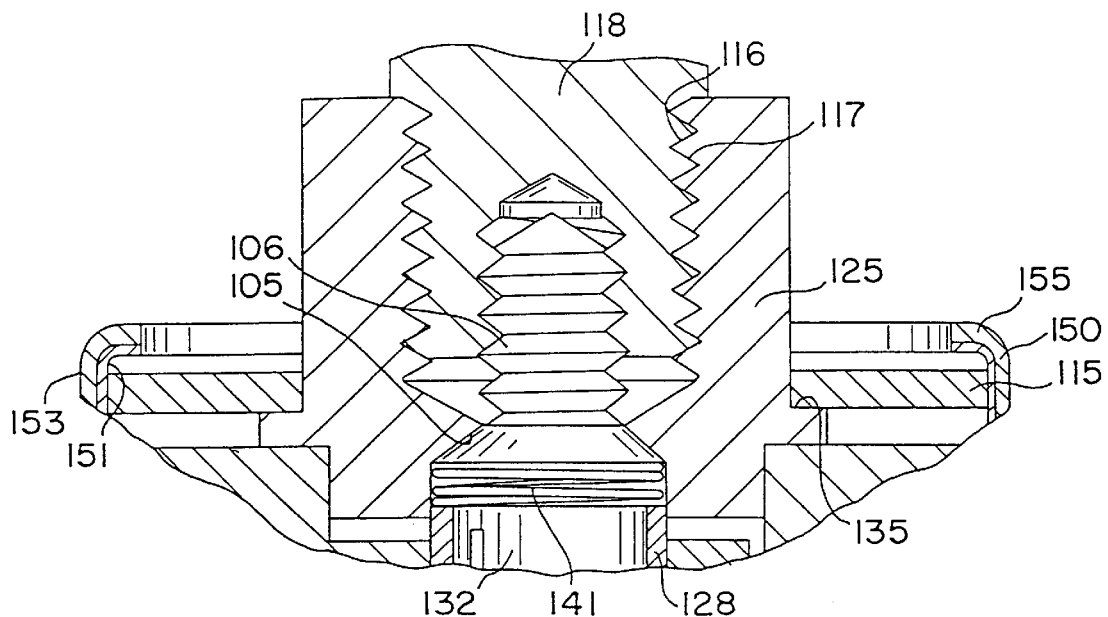
FIGS. 11 and 12 are axial cross-sectional views of alternative embodiments of engagement mechanisms for connecting a chuck to the drive spindle of a machine tool.
Figure 12:
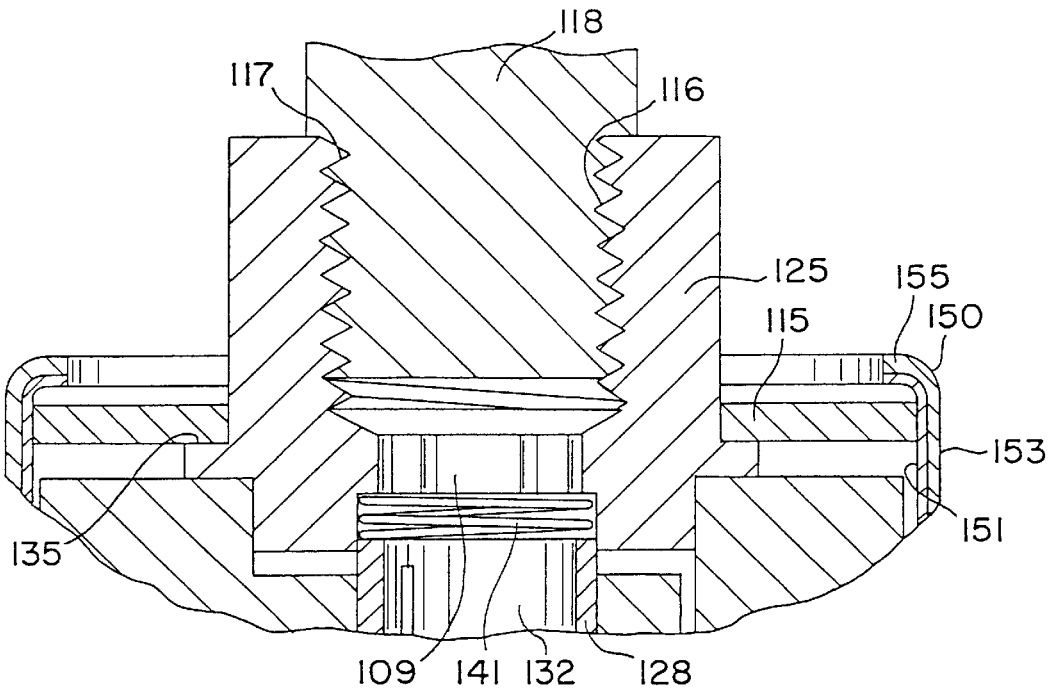

As shown in FIGS. 10–12 for example, body 125 may include a female threaded receiving section or portion 116 defined in the rear end of body 125 for engagement with a male threaded portion 117 (not shown in FIG. 10) of drive spindle 118. Similarly, as shown in FIGS. 1–3 and 15 and 17 for example, body 25, 325 may comprise a female threaded receiving section or portion 16, 316 defined in the rear end of body 25, 325 for engagement with a male threaded portion 17, 317 (in phantom, FIGS. 1 and 15) of drive spindle 18, 318. Alternatively, as shown in FIG. 9 for example, the engagement mechanism can include a tapered female unthreaded receiving portion 107 disposed in the rear end of body member 125 and configured for engagement with a male tapered mount 108 at the end of driving spindle 118. In a further alternative embodiment of the engagement mechanism, the body member may comprise a male threaded or tapered portion for engagement with a female threaded or tapered receiving portion configured in a drive spindle (not shown). Moreover, in still another alternative embodiment of the invention, body member 25, 125, 325 may be defined in the drive spindle itself. In other words, the drive spindle 18, 118, 318 and the body member 25, 125, 325, respectively, would constitute a unitary structure. And in yet another alternative preferred embodiment, chuck device 110, 210, 310 may be configured as an insert device which is insertable into a receiving socket of a drive spindle. In this socket embodiment, device 110, 210, 310 may be held in the socket by any conventional means, such as a set screw (not shown) engaging a recess defined in body member 125, 25, 325, respectively.

In a further alternative embodiment of a suitable engagement mechanism shown in FIGS. 9 and 11 for example, an axially bored opening 105 is provided through the bottom of the axial recess 120 (described below) of body member 125. A threaded retaining screw 106 is inserted through opening 105 and threaded into a threaded bore that is provided in drive spindle 118. In the FIG. 9 embodiment, the drive spindle 118 has a tapered mount 108, and screw 106 is necessary to attach spindle 118 and chuck 110. However, in the FIG. 11 embodiment, the rear end of chuck device 110 is threaded onto drive spindle 118, and screw 106 provides an extra measure of attachment between spindle 118 and chuck 110.

The engagement mechanism of the present invention can include a mounting mechanism for facilitating automated attachment of the chuck's body member to a driving spindle of a machine tool. The mounting mechanism is applicable generally to any type of chuck device. As shown in FIG. 12 for example, the mounting mechanism can include an axially bored mounting opening 109 configured to receive one of the group consisting of a torx head tool, an Allen head tool, and a square head tool. Such a tool can be inserted into mounting opening 109, pick up the chuck, carry the chuck to the machine tool, and move the rear end of the chuck body 125 into alignment and engagement with the machine tool's drive spindle 118. If the drive spindle attaches to the body member 125 by threaded engagements as shown in FIGS. 10–12, then the tool can be rotated to automatically thread the chuck 110 onto the threaded end of the drive spindle 118.

The counter centrifugal chuck device of the present invention has a mechanism or means for holding the shank of the tool bit in the chuck while the chuck is static, i.e., not rotating in its operative state. The static tool shank holding mechanism is disposed at least partially within the axial recess and longitudinally remote from the transverse opening. The static tool shank holding mechanism is configured to retain the tool shank within the axial recess in a static mode of the chuck device. The static tool shank holding means can include an inner sleeve member, an axial spring mechanism, and a retainer sleeve.

Figure 2:
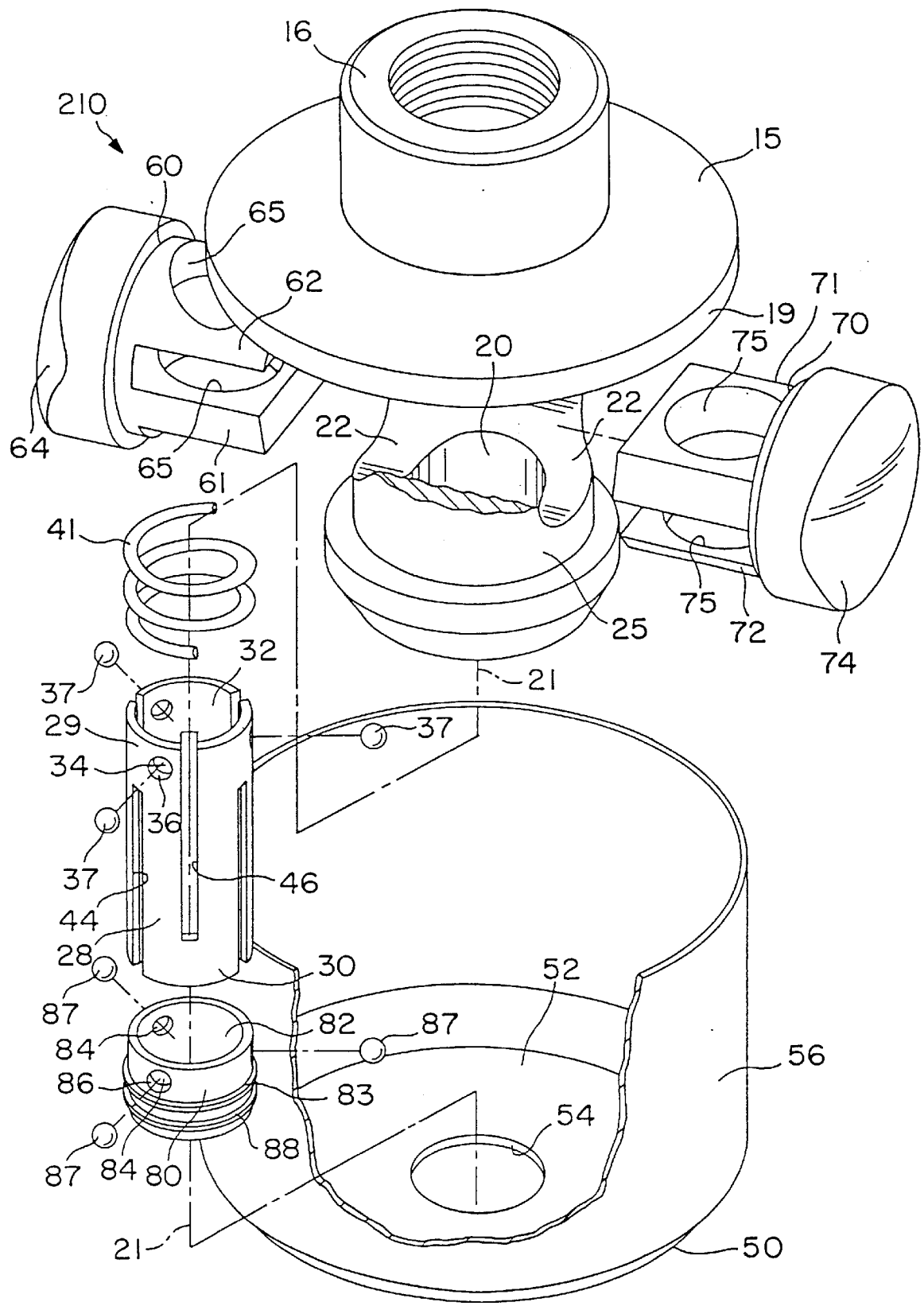
FIG. 2 is an elevated perspective assembly view of the chuck device shown in FIG. 1.
Figure 16:
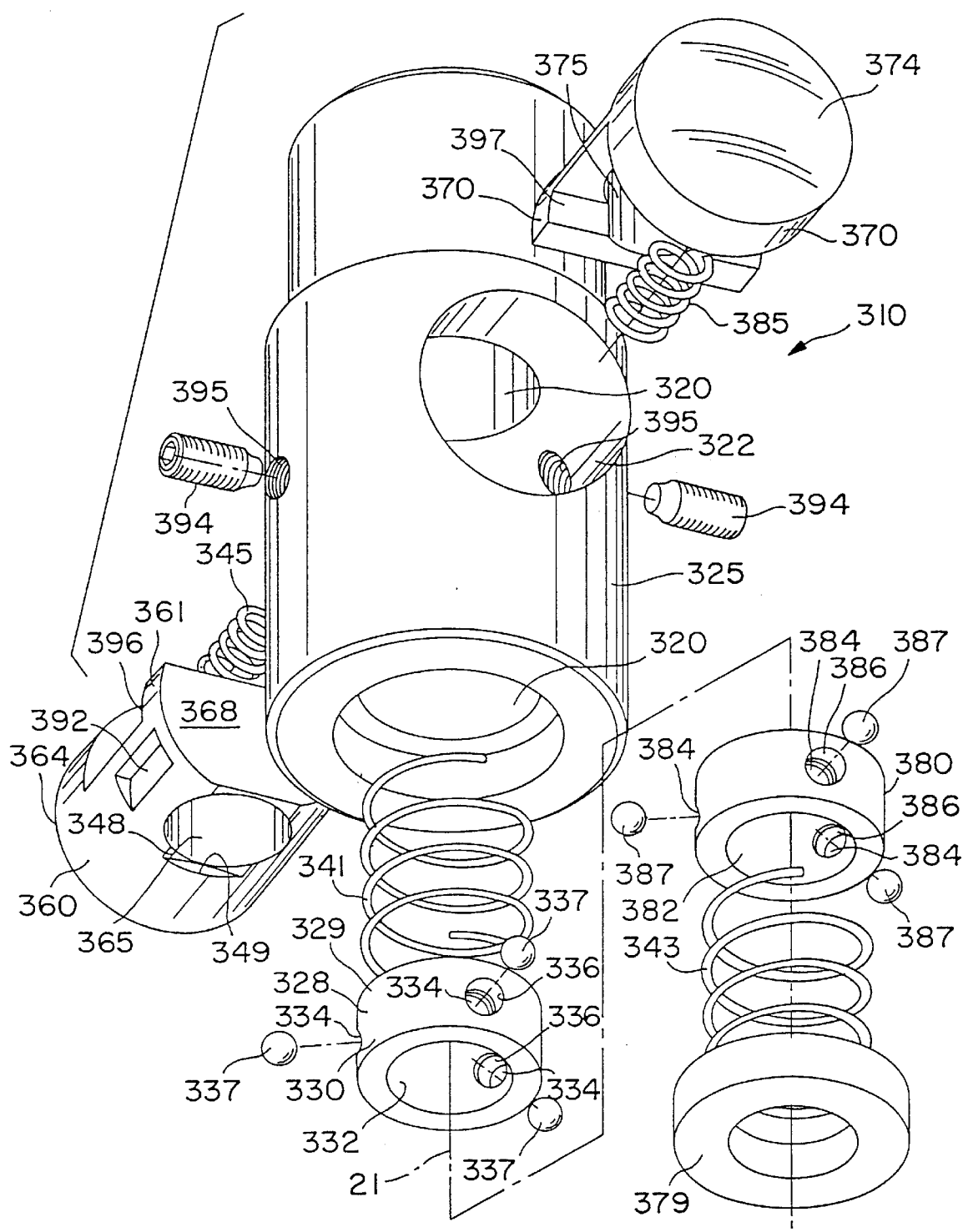
FIG. 16 is an elevated perspective assembly view of the chuck device shown in FIG. 15.

A preferred embodiment of this static tool shank holding means includes an inner sleeve member, which is preferably formed of a tubular member that elongates in the axial direction. As shown in FIGS. 10, 2 and 16 for example, an inner sleeve member 128, 28, 328 defines an inner axial bore 132, 32, 332, respectively, that elongates in the axial direction. Axial bore 132, 32, 332 is defined by a right cylindrical interior surface configured to receive therein, the shank of a tool to be held by the chuck device 110, 210, 310. The transverse, cross-sectional exterior shape of inner sleeve member 128, 28, 328 may be polygonal, but desirably is circular. When not under radially directed loads, the diameter of inner bore 132, 32, 332 is larger than the maximum diameter of the tool shank for which the chuck device is designed. The diameter of inner bore 132, 32 is smaller than the diameter of axial recess 120, 20, 320.

Inner sleeve member 128, 28 has a lower end 129, 29, 329 and an upper end 130, 30, 330 disposed opposite the lower end. As shown in FIGS. 9, 1 and 15 for example, inner sleeve member 128, 28, 328 respectively, is disposed co-axially and at least partially within the axial recess 120, 20 of body member 125, 25, 325. Inner sleeve member 128, 28, 328 is axially movable relative to body member 125, 25, 325, respectively.

Figure 3:
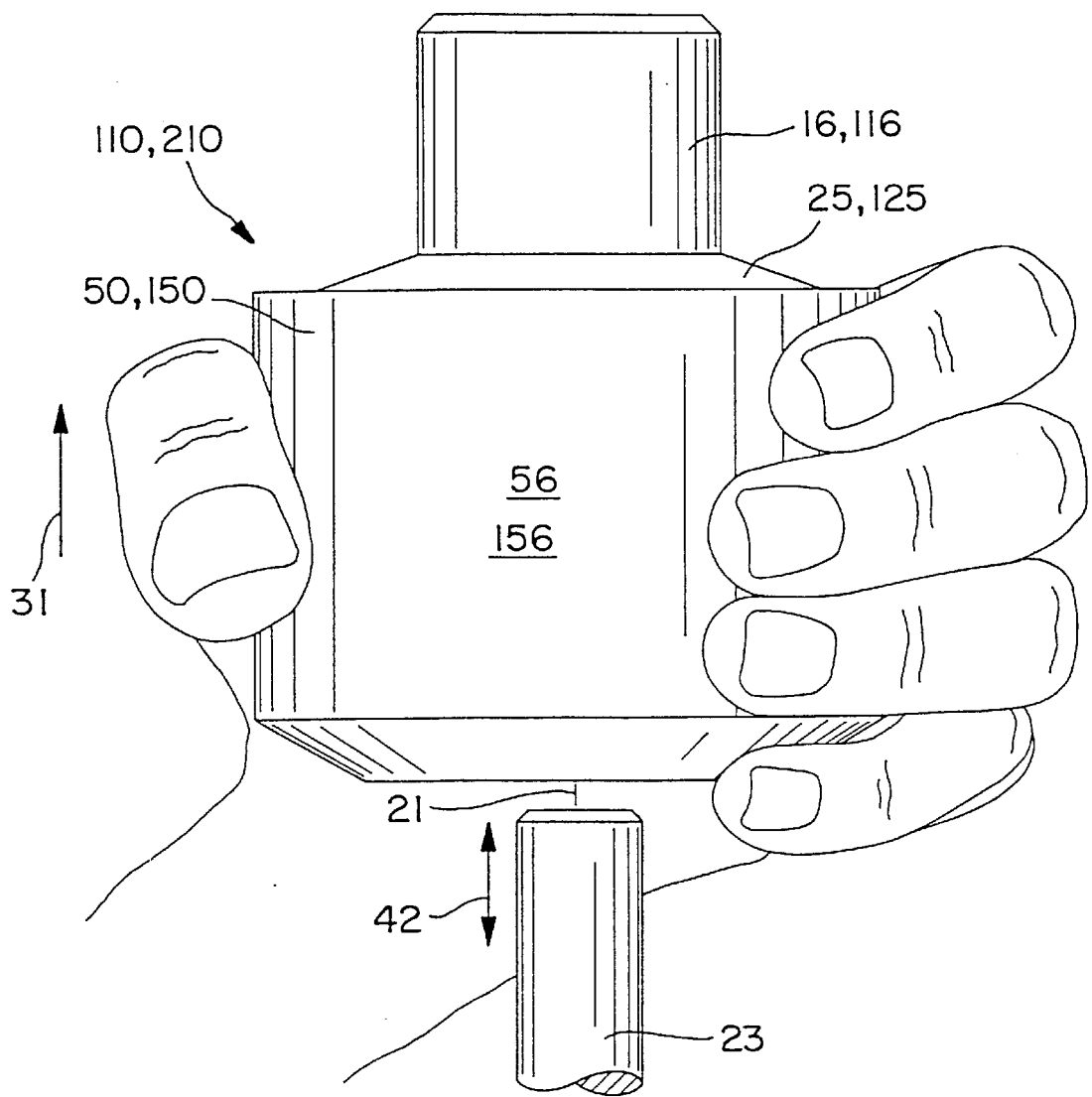
FIG. 3 is a plan view of the chuck device of FIG. 1 shown in the released position under manual activation, as indicated schematically by the two fingers partially shown.

In a presently preferred embodiment shown in FIGS. 9 and 10 and in an alternative embodiment shown in FIGS. 1–3 for example, inner sleeve 128, 28 further defines at least a first axially extending slit 144, 44 therethrough. First slit 144, 44 extends from one of the inner sleeve's upper end and lower end toward the other of the upper end and the lower end of inner sleeve 128, 28. In these embodiments, the inner sleeve 128, 28 further defines at least a second axially extending slit 146, 46 therethrough. The second slit 146, 46 extends from the end that is opposite to the end from which the first slit 144, 44 extends. A plurality of slits similar to the first and second slits are similarly disposed and symmetrically spaced apart from one another, preferably in parallel arrangement as shown in FIGS. 2 and 10. First slits 144, 44 and second slits 146, 46 alternate circumferentially about inner sleeve 128, 28, respectively. First slits 144, 44 and second slits 146, 46 cooperate to render the inner sleeve diametrically flexible and circumferentially flexible so as to permit both expansion and contraction of the diameter and circumference of the inner sleeve upon the application of the appropriately directed forces. Moreover, the inner sleeves 128, 28 of these embodiments are composed of material such as stainless steel that enables the sleeve with these slits to be radially compressed and expanded repeatedly in a resilient fashion.

In a presently preferred embodiment shown in FIGS. 9 and 10 for example, upper end 130 of inner sleeve member 128 has a free edge 131 and a tapered exterior surface 133. The exterior surface 133 of upper end 130 of inner sleeve 128 is shaped to taper axially toward free edge 131 of upper end 130 of inner sleeve 128. Thus, the diameter of exterior surface 133 decreases as one approaches free edge 131.

In addition to an inner sleeve member, a preferred embodiment of the chuck's means for holding the static shank of a tool, includes an axial spring mechanism that is disposed relative to the inner sleeve member and the body member so as to bias the inner sleeve member axially relative to the body member. As shown in FIG. 9, 1–5 and 15–17 for example, the chuck device 110, 210, 310 includes respectively an axial spring mechanism 141, 41, 341 that is disposed relative to inner sleeve member 128, 28, 328 and body member 125, 25, 325 so as to bias inner sleeve member 128, 28, 328 axially relative to body member 125, 25, 325. FIGS. 9, 1, 5 and 17 depict inner sleeve member 128, 28 or 328 in its so-called biased position, also referred to as the engaged position, of the respective chuck device 110, 210, 310. The axial spring mechanism 141, 41, 341 permits inner sleeve member 128, 28, 328 to be axially movable against the biasing force of the spring mechanism 141, 41, 341 to a released position, which is shown for example in FIGS. 3, 3A and 4 for chuck embodiment 210 and in FIG. 15 for chuck embodiment 310.

In addition to inner sleeve member 128 and axial spring mechanism 141, a preferred embodiment of the chuck's means for holding the static shank of a tool, includes a tapered interior surface that is disposed to oppose the tapered exterior surface 133 of upper end 130 of inner sleeve 128. As shown in FIG. 9 for example, a tapered interior surface 134 is disposed to oppose the tapered exterior surface 133 of upper end 130 of inner sleeve 128. Preferably, this interior surface 134 is provided on a retainer sleeve such as taper plate 180 that is seated in an upper pocket 126 (FIG. 9), which is defined in and communicating with the axial recess 120 of body member 125. As shown in FIGS. 9 and 10 for example, interior surface 134 of retainer sleeve 180 defines an inner channel 182 disposed about upper end 130 of inner sleeve 128. As shown in FIG. 9 for example, this inner channel 182 is generally opposed to exterior surface 133 of upper end 130 of inner sleeve 128. Moreover, interior surface 134 is configured to taper axially with reducing diameter as the portion of interior surface 134 that is opposed generally to exterior surface 133 of upper end 130 of inner sleeve 128 approaches the free edge 131 of upper end 130.

As shown in FIG. 9 for example, when interior surface 134 of retainer sleeve 180 contacts exterior surface 133 of upper end 130 of inner sleeve 128 so as to compress upper end 130 radially inward toward axis 21 (FIG. 10), then the diameter of axial bore 132 in the biased position of inner sleeve 128 becomes sufficiently reduced so as to grip the shank of a tool inserted therein. Spring mechanism 141 exerts sufficient force in the axial direction on inner sleeve 128 in its biased position to cause interior surface 134 to effect the desired compression of upper end 130 of inner sleeve 128.

In an alternative embodiment, interior surface 134 can be provided on body member 125 itself at the upper end thereof. However, the provision of inner tapered surface 134 on a component separate from body member 125, permits greater manufacturing and inventory flexibility for chuck device 110.

Figure 4:
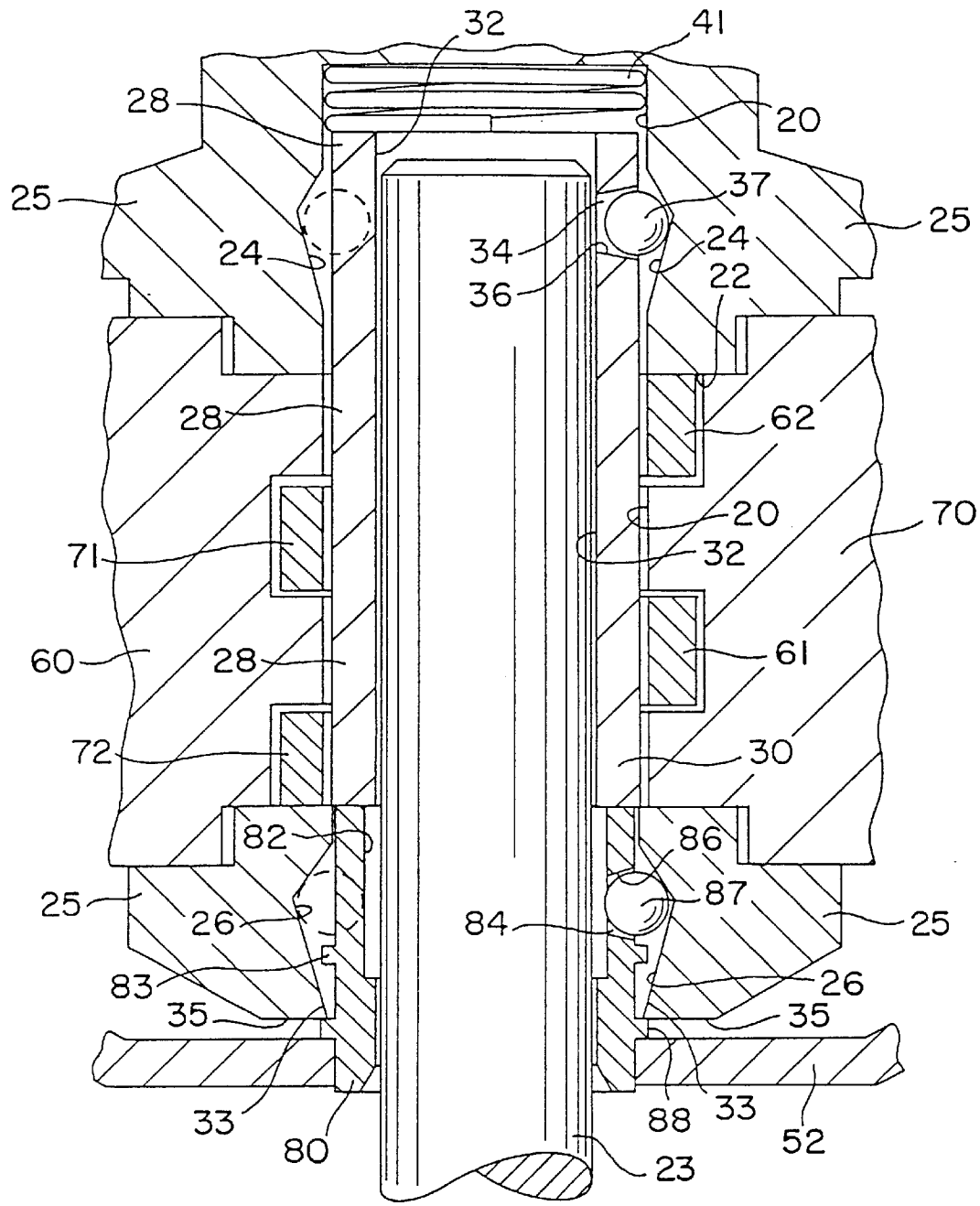
FIG. 4 is a partial, expanded, axial cross-sectional view of components of the device of FIG. 3 in the released position.

In an alternative embodiment of the chuck's means for holding the static shank of a tool shown in FIG. 4 for example, in addition to axial spring mechanism 41, inner sleeve member 28 further defines at lower end 29 thereof at least a first collar opening 34 defined by a first collar surface 36. Similarly, in another alternative embodiment of the chuck's means for holding the static shank of a tool shown in FIG. 16 for example, in addition to axial spring mechanism 341, inner sleeve member 328 further defines at least a first collar opening 334 defined by a first collar surface 336. Preferably, a plurality of collar openings 34, 334, each defined by a collar surface 36, 336, is included and disposed symmetrically about the inner sleeve member 28, 328. Three such first collar openings 34, 334 are depicted in the alternative embodiments shown.

Figure 5:
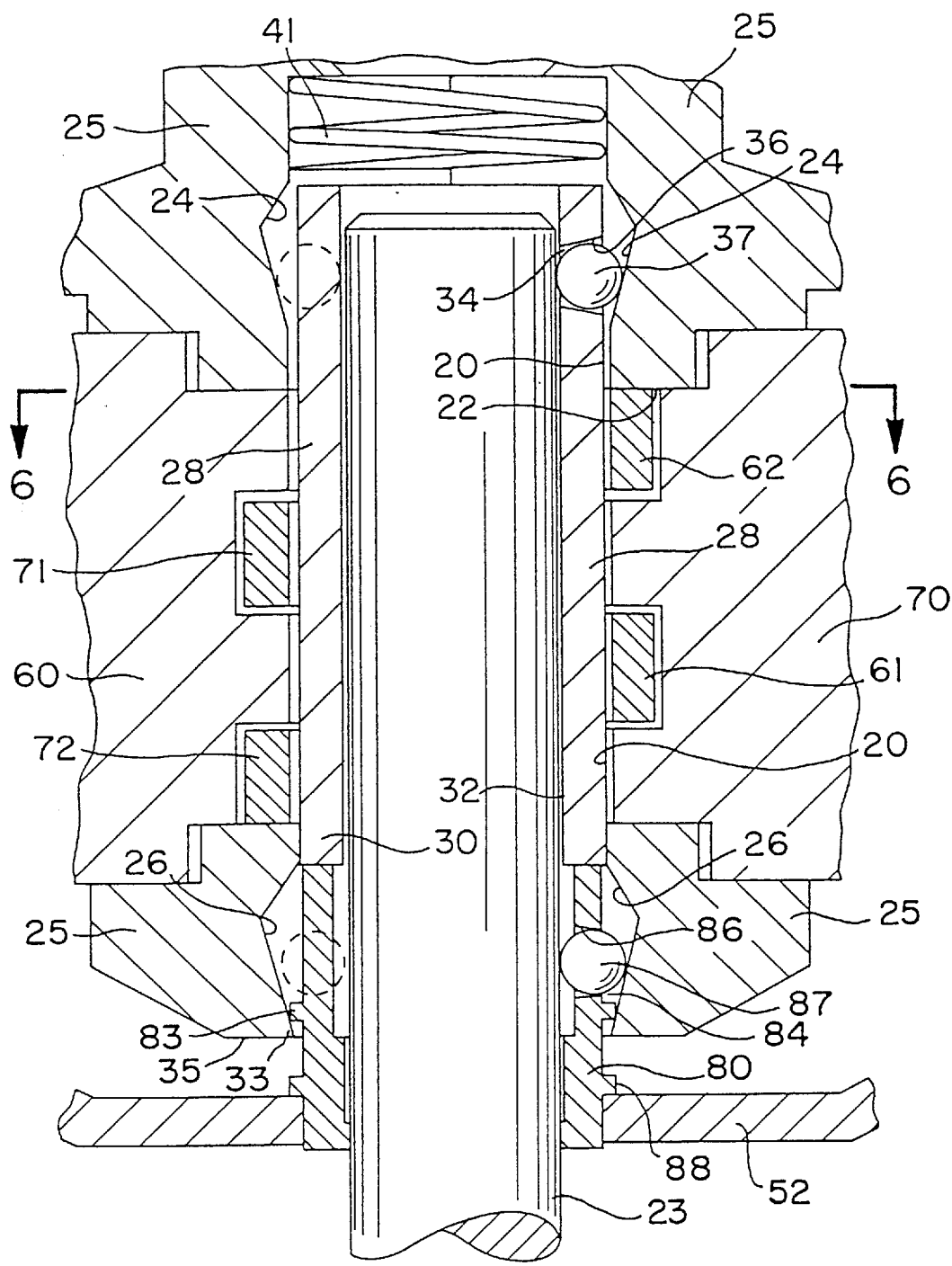
FIG. 5 is a partial, expanded, axial cross-sectional view of components of the device of FIG. 1 in the engaged position.
Figure 6:
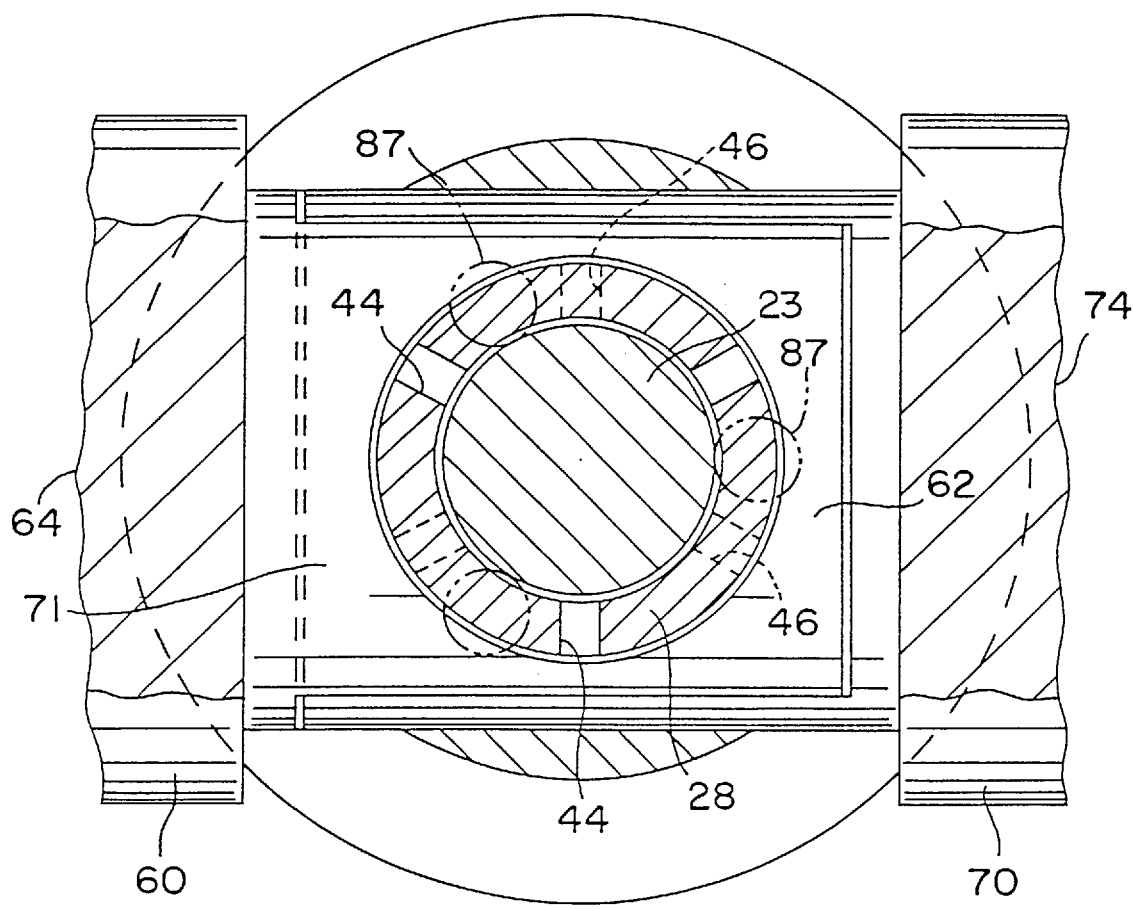
FIG. 6 is a cross-sectional view of components of the device of FIGS. 1 and 5 in the engaged position and taken along the line of sight indicated by arrows designated 6—6 in FIG. 5.
Figure 17:
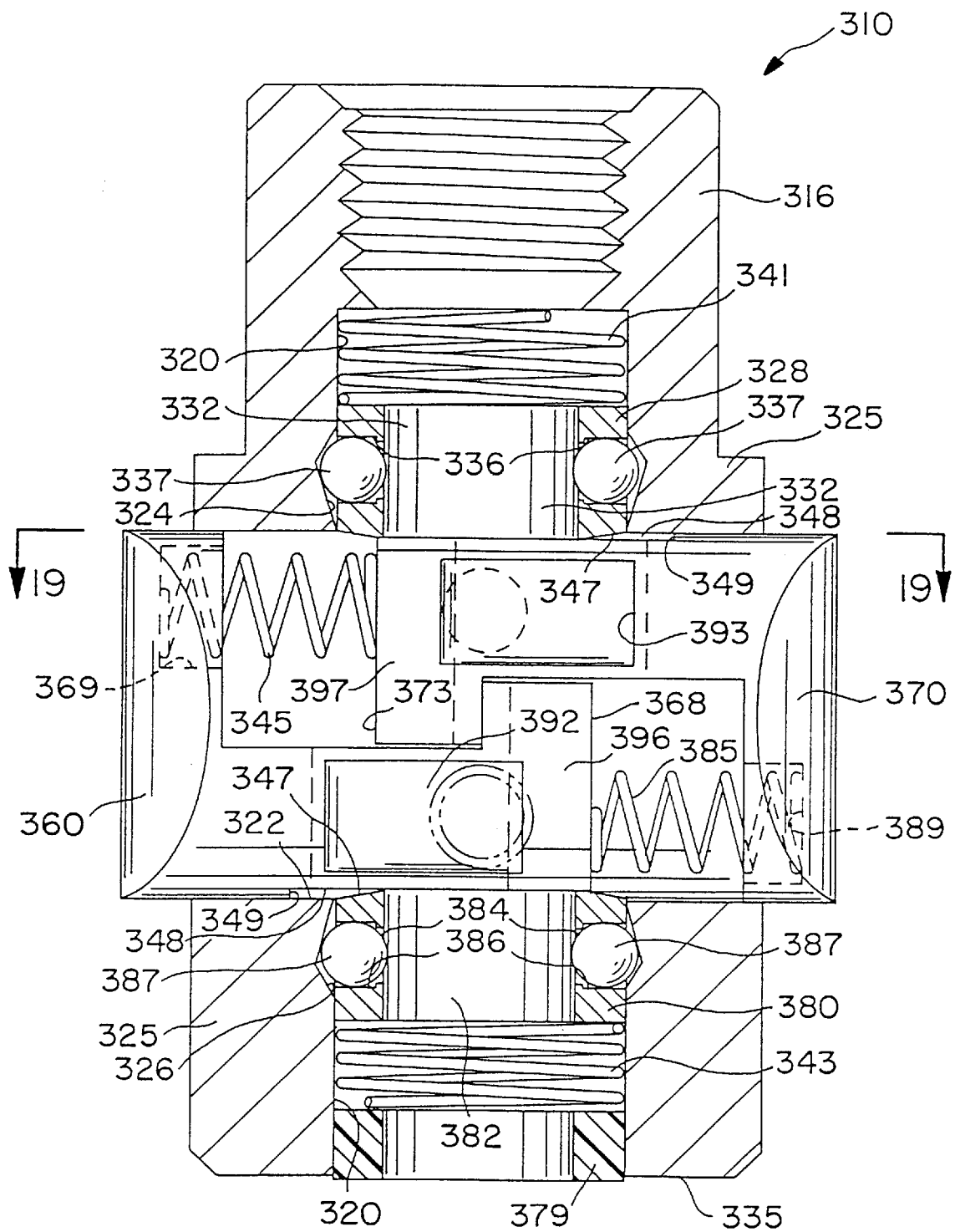
FIG. 17 is an axial cross-sectional view of the chuck device of FIG. 15 shown in the unengaged position without the tool shank inserted in the chuck device.

As shown in FIGS. 4 and 16, each collar opening 34, 334 is sized to receive a retractable gripping element 37, 337 (described below). As shown in FIGS. 5 and 17 for example, each collar surface 36, 336 is configured and sized to permit such gripping element 37, 337 to protrude radially into axial bore 32, 332 up to a predetermined extent. As shown in FIGS. 4, 5 and 17 for example, each collar surface 36, 336 is conically shaped, with the base of the cone defined through the exterior surface of inner sleeve 28, 328 and narrowing as the collar opening extends radially toward the interior surface defining axial bore 32, 332 of the inner sleeve 28, 328.

As shown in FIGS. 2, 4, 16 and 17 for example, each retractable gripping element 37, 337 can be configured as a spherical element such as a ball wherein the diameter of each ball is smaller than the diameter of the base portion of each corresponding collar opening 34, 334 defined through the exterior circumference of inner sleeve member 28, 328. However, each collar opening 34, 334 is sized smaller than the diameter of each ball 37, 337 where such collar opening 34, 334 connects to inner axial bore 32, 332 of inner sleeve member 28, 328. In this way, each ball 37, 337 cannot pass from the exterior circumference of inner sleeve member 28, 328 through its respective collar opening 34, 334 and completely into the inner axial bore 32, 332 of inner sleeve member 28, 328.

In the alternative embodiments of the chuck's means for holding the static shank of a tool shown in FIGS. 4, 5 and 17 for example, the interior surface of body member 25, 325 further defines a first tapered annular pocket 24, 324 communicating with axial recess 20, 320. This first or lower pocket 24, 324 is disposed in body member 25, 325 beneath transverse opening 22, 322 and thus is disposed between opening 22, 322 and female threaded receiving portion 16, 316 shown in FIGS. 3A and 17 for example. First or lower pocket 24, 324 is configured to taper in a manner such that lower pocket 24, 324 becomes increasingly shallow upon approaching closer to transverse opening 22, 322.

As shown in FIGS. 4, 5 and 17 for example, each first retractable gripping element 37, 337 is confined by first collar surface 36, 336 and first tapered annular pocket 24, 324. As shown in FIGS. 5 and 17 for example, when spring mechanism 41, 341 forces inner sleeve 28, 328 axially toward the front end 35, 335 of body member 25, 325 each first gripping element 37, 337 contacts a corresponding first collar surface 36, 336 and thereby is forced radially inward within first collar opening 34, 334. In this manner, each gripping element 37, 337 extends into axial inner bore 32, 332 in the biased position of inner sleeve 28, 328 and contacts any tool shank 23, 323 disposed therein. Such contact provides enough friction to hold the tool within the chuck against the force of gravity and without relative rotation relative to the chuck when the tool is not under load. As shown in FIGS. 3, 3A, 4 and 15 for example, each first gripping element 37, 337 is movable radially outward within first tapered annular pocket 24, 324 in the released position of inner sleeve 28, 328.

In an alternative embodiment of the chuck's means for holding the static shank of a tool shown in FIGS. 2, 4, 5 and 15–17 for example, the quick-change chuck device 210, 310 includes a retainer sleeve 80, 380, which is configured to be disposed at least partially within axial recess 20, 320 of body member 25, 325. As shown in FIGS. 4 and 5 for example, one end of retainer sleeve 80 is disposed in opposition to, and actually butts against, the upper end 30 of inner sleeve 28. Thus, spring mechanism 41 renders retainer sleeve 80 axially movable relative to body member 25 to the same extent as inner sleeve 28. As shown in FIGS. 15–17 for example, an alternative embodiment of retainer sleeve 380 is configured to be disposed between forward end 335 of body member 325 and transverse opening 322 of body member 325.

As shown in FIGS. 2 and 17 for example, retainer sleeve 80, 380 defines an inner channel 82, 382 that is configured concentrically with axial inner bore 32, 332 of inner sleeve 28, 328. The diameter of inner channel 82, 382 is larger than the maximum diameter of the tool shank 23, 323 for which the chuck device is designed. The diameter of inner channel 82, 382 is smaller than the diameter of axial recess 20, 320.

In the alternative embodiment shown in FIG. 2 for example, retainer sleeve 80 further defines at the lower end thereof, at least a second collar opening 84 defined by a second collar surface 86. In another alternative embodiment shown in FIG. 16 for example, a second collar surface 386 is defined in retainer sleeve 380 and further defines at least a second collar opening 384. Preferably, a plurality of second collar openings 84, 384, each defined by a second collar surface 86, 386, is included and disposed symmetrically about retainer sleeve 80, 380. Three such second collar openings 84, 384 are depicted in the alternative embodiments shown.

As shown in FIGS. 4 and 17 for example, each second collar opening 84, 384 is sized to receive a retractable second gripping element 87, 387 (described below). As shown in FIGS. 5 and 17 for example, each second collar surface 86, 386 is configured and sized to permit such corresponding second gripping element 87, 387 to protrude radially into axial inner channel 82, 382 up to a predetermined extent. As shown in FIGS. 4, 5 and 17 for example, each second collar surface 86, 386 is conically shaped, with the base of the cone defined through the exterior surface of retainer sleeve 80, 380 and narrowing as the collar opening extends radially toward the interior surface of the retainer sleeve 80, 380.

As shown in FIGS. 2 and 4 for example, each retractable second gripping element 87 can be configured as a spherical element such as a ball wherein the diameter of each ball is smaller than the diameter of each corresponding second collar opening 84 defined through the exterior circumference of retainer sleeve 80. However, each second collar opening 84 is sized smaller than the diameter of each ball 87 where such collar opening 84 connects to inner axial channel 90 of retainer sleeve 80. In this way, each ball 87 cannot pass from the exterior circumference of retainer sleeve 80 through its respective collar opening 84 and completely into the inner axial channel 82 of retainer sleeve 80.

Figure 3A:
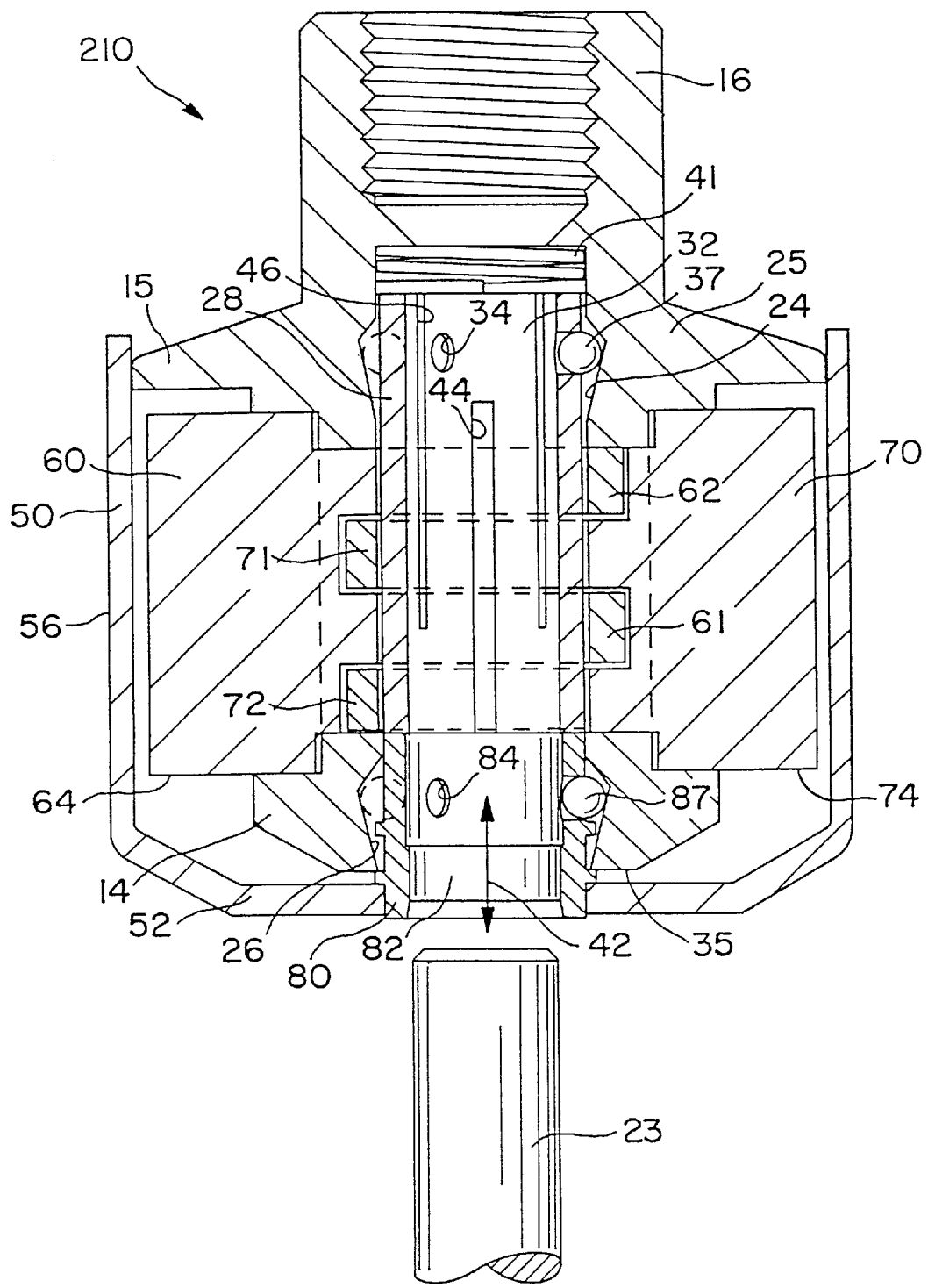
FIG. 3A is an axial cross-sectional view of the chuck device of FIG. 1 shown in the released position.

As shown in FIGS. 3A and 17 for example, a second tapered annular pocket 26, 326 is disposed in body member 25, 325 above transverse opening 22, 322 and thus is disposed between opening 22, 322 and the forward end 35, 335 of body member 25, 325. This second or upper pocket 26, 326 also communicates with axial recess 20, 320. As shown in FIGS. 4 and 5 for example, upper pocket 26 is configured to taper in a manner such that the upper pocket 26 becomes increasingly deep upon approaching closer to transverse opening 22. As shown in FIG. 17 for example, upper pocket 326 is configured to taper in a manner such that the upper pocket 326 becomes increasingly shallow upon approaching closer to transverse opening 322.

As shown in FIGS. 4, 5 and 17 for example, each second retractable gripping element 87, 387 is confined by a second collar surface 86, 386 and by second tapered annular pocket 26, 326 formed in body member 25, 325. As shown in FIG. 5 for example, when spring mechanism 41 forces inner sleeve 28 axially toward the front end 35 of body member 25, each second gripping element 87 contacts a corresponding second collar surface 86 and thereby is forced radially inward within second collar opening 84. Similarly, as shown in FIG. 17 for example, when an auxiliary spring mechanism 343 forces retainer sleeve 380 to move axially away from the front end 335 of body member 325, each second gripping element 387 contacts a corresponding second collar surface 386 and second tapered annular pocket 326 and thereby is forced radially inward within second collar opening 384. In this manner, each second gripping element 87, 387 extends into axial inner channel 82 in the biased position of retainer sleeve 80, 380 and contacts any shank 23, 323 disposed therein. As shown in FIGS. 4 and 15 for example, each second gripping element 87, 387 is movable radially outward within second tapered annular pocket 26, 326 in the released position of retainer sleeve 80, 380, whereby shank 23, 323 is released as depicted in FIGS. 3, 3A and 15 for example.

The counter centrifugal chuck device of the present invention has means for holding the shank of the tool bit in the chuck while the chuck is rotating under load in its operative state. This dynamic or centrifugal holding means for the tool shank includes at least one transverse locking member disposed in the transverse opening and configured to lock the tool shank within the axial recess. While other types of transverse locking members can be employed in the present invention, a pair of opposed transverse locking members are preferably provided in the form of first and second cam members disposed at least partially within the transverse opening. These cam members have respective first and second passages, that can be disposed concentrically with the axial recess of the body member and with each of the inner axially extending bore of the inner sleeve member and the interior channel of the retainer sleeve. As discussed, the unique design of the body member allows for use of a wider variety of configurations of engagement mechanisms. It should be appreciated that this advantage can be gained with any suitable locking member operably disposed in at least a part of the transverse opening.

As shown in FIGS. 9, 10, 1–3 and 15–17 for example, the quick-change chuck device 110, 210, 310 includes a first cam member 160, 60, 360 and a second cam member 170, 70, 370. As shown in FIGS. 10, 2 and 16, first cam member 160, 60, 360 defines at least a first finger 161, 61, 361 at a first end thereof. As shown in FIGS. 10, 2 and 16, first cam member 160, 60, 360 also has a first throw-weight portion 164, 64, 364 at a second end of first cam member 160, 60, 360 and disposed opposite to the first end. First finger 161, 61, 361 of first cam member 160, 60, 360 respectively, is configured to pass through transverse opening 122, 22, 322 of body member 125, 25, 325. In an alternative embodiment shown in FIG. 2, first cam member 60 is provided with another finger 62 spaced apart from and extending generally parallel to first finger 61. The other finger of first cam member 60 is also configured to pass through transverse opening 22 of body member 25 together with first finger 61.

Similarly, as shown in FIGS. 10, 2 and 16, second cam member 170, 70, 370 defines at least a second finger 171, 71, 371 at a first end thereof. Second cam member 170, 70, 370 also has a second throw-weight portion 174, 74, 374, respectively, at a second end of second cam member 170, 70, 370 and disposed opposite to the first end. Second finger 171, 71, 371 of second cam member 170, 70, 370 is configured to pass through transverse opening 122, 22, 322 of body member 125, 25, 325. In the alternative embodiment shown in FIG. 2 for example, second cam member 70 is provided with another finger 72 spaced apart from and extending generally parallel to second finger 71. As shown in FIGS. 1–3, the other finger of second cam member 70 is also configured to pass through transverse opening 22 of body member 25.

As shown in FIGS. 9, 10, 2, 7 and 16, first finger 161, 61, 361 of first cam member 160, 60, 360 defines a first passage 165, 65, 365, respectively, that is configured concentrically with and about axial recess 120, 20, 320 of body member 125, 25, 325 during at least a first predetermined disposition (as in FIGS. 9, 6 and 18 for example) of first finger 160, 60, 360 within transverse opening 122, 22, 322 of body member 125, 25, 325. In the preferred embodiments, first passage 165, 65 is configured to allow inner sleeve 128, 28 to pass axially through first passage 165, 65. In the alternative embodiment shown in FIGS. 15–19 for example, first passage 365 is configured to allow the tool shank 323 to pass axially through first passage 365. Moreover, in the alternative embodiment shown in FIGS. 2 and 7 for example, the other finger of first cam member 60 also defines a first passage 65 that is configured concentrically with and about axial recess 20 of body member 25 during at least a first predetermined disposition (as in FIG. 6 for example) of first finger 60 within transverse opening 22 of body member 25.

Similarly, as shown in FIGS. 9, 10, 2, 7 and 16, second finger 171, 71, 370 of second cam member 170, 70, 370 defines a second passage 175, 75, 375, respectively, that is configured concentrically with and about axial recess 120, 20, 320 of body member 125, 25 325 during at least a first predetermined disposition (as in FIGS. 9, 6 and 18 for example) of second finger 170, 70, 370 within transverse opening 122, 22, 322 of body member 125, 25, 325. In the preferred embodiment, second passage 175, 75 is configured to allow inner sleeve 128, 28 to pass axially through second passage 175, 75. In the alternative embodiment shown in FIGS. 15–19 for example, second passage 375 is configured to allow the tool shank 323 to pass axially through second passage 375. Similarly, in the alternative embodiment shown in FIGS. 2 and 7, the other finger of second cam member 70 defines a second passage 75 that is configured concentrically with and about axial recess 20 of body member 25 during at least a first predetermined disposition (as in FIG. 6 for example) of second finger 70 within transverse opening 22 of body member 25.

Figure 7:
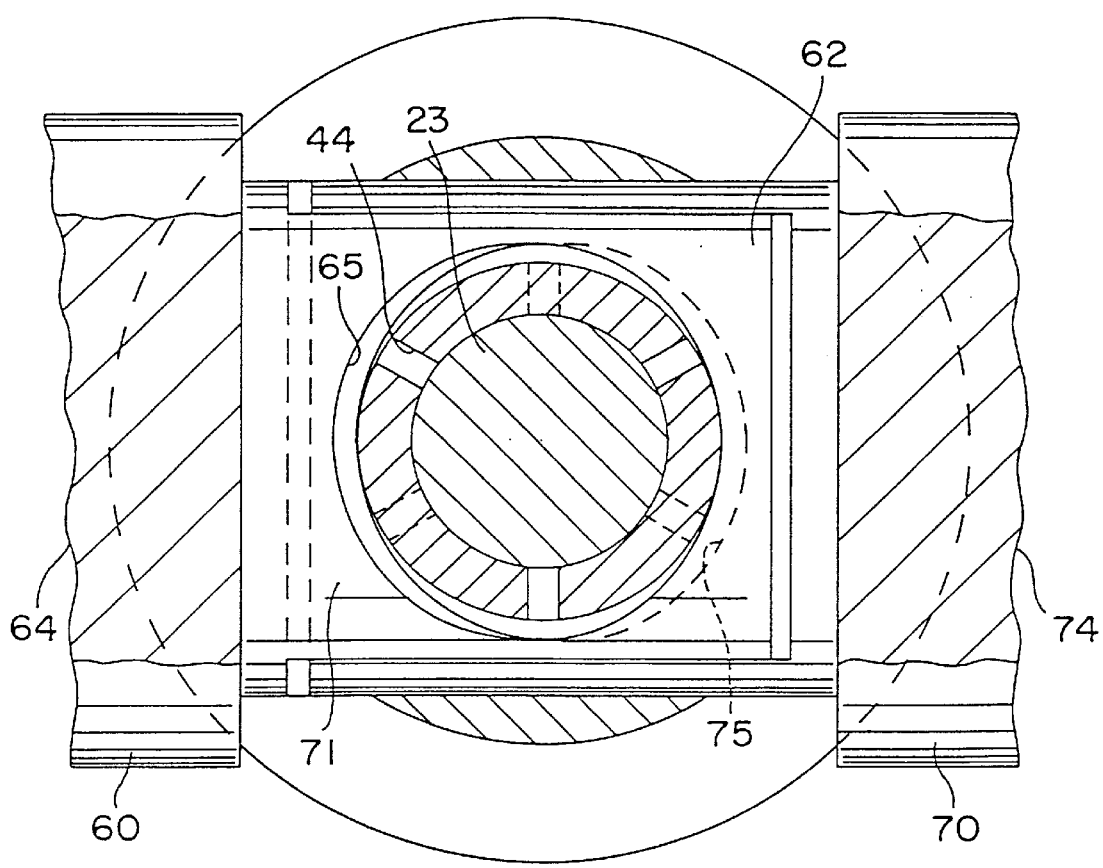
FIG. 7 is a cross-sectional view similar to the one of FIG. 6, but without the tool shank inserted into the chuck, which is shown in the released position.

In dynamic operation, i.e., when the chuck device 110, 210 is rotating under load, first cam 160, 60, 360 and second cam 170, 70, 370 are forced from their rest position (shown in FIG. 6 for example) to their gripping position (shown in FIG. 7 for example). In particular, when the chuck is rotating, centrifugal force acts to pull first throw-weight portion 164, 64, 364 and second throw-weight portion 174, 74, 374 radially away from the central axis 21 of body member 125, 25, 325. In doing so, first passage 165, 65, 365 and second passage 175, 75, 375 become nonconcentric relative to axial recess 120, 20, 320 as first finger 161, 61, 361 and second finger 171, 71, 371 apply pressure.

In addition to the first and second cam members and the transverse opening in the body member, the presently preferred embodiment of the centrifugal holding means also can include the inner sleeve. In the preferred embodiment and one of the alternative embodiments, the fingers 161, 171, 61, 71 apply pressure to compress the inner sleeve 128, 28 around any shank 23 disposed within axial bore 132, 32 thereof. In the alternative embodiment of FIGS. 15–19, fingers 361, 371 radially apply pressure directly to the shank 323.

In a preferred embodiment of the centrifugal holding means shown in FIGS. 9 and 10 for example, a supplemental tightening mechanism is provided by tapering the lower outer surface 137 of inner sleeve 128 and the surfaces that define first and second passages 165, 175 of first and second fingers 161, 171 of first and second cams 160, 170. As shown in FIGS. 9 and 10, the diameter of the outer surface of inner sleeve 128 diminishes as one approaches lower end 129 of inner sleeve member 128 and so tapers toward lower end 129. Moreover, the surfaces of first and second passages 165, 175 that oppose this tapering outer surface 137 of inner sleeve 128, are also tapered with decreasing diameters as one approaches lower end 129 of inner sleeve member 128 and so tapers toward lower end 129. Thus, as shown in FIG. 9 for example, the smallest diameter portion of second passage 175 has a larger diameter than the largest diameter portion of first passage 165.

In addition, a countersunk cavity 138 is defined in body member 125 around opposite ends of transverse opening 122. Countersunk cavity 138 is configured to receive a respective first and second throw-weight portion 164, 174 of first and second cam members 160, 170 in sliding engagement therewith. As shown in FIG. 10 for example, each countersunk cavity 138 is defined by a planar front surface 139 disposed perpendicularly to a cylindrical annular surface 140.

The faster the chuck device 110 rotates, the greater the centrifugal force acting radially on cams 160, 170. Because annular surface 140 (FIG. 9) restrains axial movement of first and second fingers 161, 171 and the tapered surfaces of first and second passages 165, 175 defined therein, radial movement of cams 160, 170 squeezes inner sleeve 128 axially toward the front end 135 of body member 125 and further against tapered interior surface 134 of taper plate portion 180 of the front end 135 of body member 125. This causes ever greater compressive forces to bear against tapered exterior surface 133 of upper end 130 of inner sleeve member 128. These increasing compressive forces act to reduce further the diameter of axial bore 132 of inner sleeve member 128 in the local vicinity of retainer sleeve 180 and thus further tightens the grip of the chuck device 110 about the shank of any tool inserted therein.

In the alternative embodiments shown in FIGS. 1 and 15 for example, the centrifugal holding means does not include a supplemental tightening mechanism, and neither the lower portion of the outer surface of inner sleeve 28 nor the surfaces forming first passages 65, 365 and second passages 75, 375, are tapered.

In accordance with the presently preferred embodiments of the present invention, the chuck desirably secures the shank of the tool in a manner that reduces the incidence of marking of shanks that happen to be formed of relatively soft steel. The inner sleeve 128, 28 and the slits 144, 44 and 146, 46 of inner sleeve 128, 28 aid in accomplishing this trait of the chuck device of the present invention.

Presently preferred embodiments of the chuck device according to the present invention include a means for mounting the cover member. As shown in FIGS. 9 and 10 for example, the means for mounting the cover member of quick-change chuck device 110 includes a cover mounting sleeve 178, which is configured to be disposed at least partially within axial recess 120 of body member 125. As shown in FIGS. 2, 4, and 5 for example, the means for mounting the cover member of quick-change chuck device 210 includes the provision of a lower circumferential retaining flange 83 and an upper circumferential retaining flange 88 that is spaced apart from and generally parallel to lower flange 83 on retainer sleeve 80. As shown in FIGS. 9, 4 and 5 for example, one end of cover mounting sleeve 178 or retainer sleeve 80 is disposed in opposition to the upper end 130, 30 of inner sleeve 128, 28. In a preferred embodiment shown in FIGS. 9 and 10 for example, cover mounting sleeve 178 is received slidably within an upper groove 181 defined in retainer sleeve 180 and can move axially relative thereto. In an alternative embodiment shown in FIGS. 4 and 5 for example, retainer sleeve 80 butts against upper end 30 of inner sleeve 28, and spring mechanism 41 renders retainer sleeve 80 axially movable relative to body member 25 to the same extent as inner sleeve 28. An end flange 33 at the front end 35 of body member 25 is fitted between the two circumferential flanges 83, 88, which act as lower and upper stops for movement of retainer sleeve 80 (and thus inner sleeve 28) relative to body member 25.

As shown in FIG. 9 for example, cover mounting sleeve 178 defines an interior channel 190 that is configured concentrically with axial inner bore 132 of inner sleeve 128. The diameter of interior channel 190 is larger than the maximum diameter of the tool shank 23 for which the chuck device is designed. The diameter of interior channel 190 is smaller than the diameter of axial recess 120.

In a preferred embodiment shown in FIGS. 9 and 10 for example, a dust seal 179 in the form of a resilient O-ring is received in a circumferential groove 191 formed in the interior surface of cover mounting sleeve 178. In an alternative embodiment shown in FIGS. 15–17 for example, a dust seal 379 in the form of a resilient O-ring is press fit in axial recess 320 of body member 325 near forward end 335 of body member 325. O-ring 379 is configured with an interior diameter commensurate with the diameter of inner axially extending bore 332 of inner sleeve member 328. Dust seal 179, 379 serves to prevent dust and debris generated during tool operation, from entering the space, such as axial bore 132, 332 of inner sleeve 128, 328, that is to be occupied by the shank 123, 323 of any tool to be held by the chuck device.

As shown in FIGS. 9, 10 and 1–3 for example, presently preferred embodiments of the quick-change chuck device include an outer sleeve 150, 50 that is configured and disposed about body member 125, 25, respectively. As shown in FIGS. 9 and 2 for example, outer sleeve 150, 50 defines a cap portion 152, 52. A centrally disposed hole 154, 54 is defined in cap portion 152, 52 and is configured to receive a portion of cover mounting sleeve 178, 78 therethrough. Cap portion 152, 52 of outer sleeve 150, 50 is press-fitted to cover mounting sleeve 178, 78. In an alternative embodiment shown in FIGS. 4 and 5 for example, cap portion 52 is press-fitted against an upper circumferential retaining flange 88 of cover mounting sleeve 78.

In a preferred embodiment shown in FIGS. 9–13 for example, outer sleeve 150 can be formed of an inner shell 151 and an outer shell 153, which overlies and conforms to the exterior surface of inner shell 151. Typically, inner shell 151 would be composed of metal such as stainless steel, and outer shell 153 would be composed of a plastic material (e.g., a structural or engineering plastic such as glass filled nylon or glass filled polypropylene) that has a high coefficient of friction. Outer shell 153 can be comolded over inner shell 151, and the exterior surface of outer shell 153 can be provided with a texture and surface features that satisfy aesthetic and/or functional requirements.

The centrifugal chuck device 110, 210 can include an apron flange 115, 15 disposed beneath transverse opening 122, 22 and extending radially from body member 125, 25. As shown in FIGS. 10 and 2 for example, apron flange 115, 15 defines a circumferentially extending free edge 119, 19. Outer sleeve 150, 50 defines a shroud portion 156, 56 extending axially from cap portion 152, 52 and overlapping free edge 119, 19 of apron flange 115, 15 of body member 125, 25. In a preferred embodiment shown in FIGS. 9 and 10 for example, the apron flange 115 is provided in the form of a circular washer that is press-fitted to body member 125 and rests against a support ledge 163. In an alternative embodiment shown in FIGS. 1–3 for example, apron flange 15 and body member 25 form a unitary structure.

Figure 13:
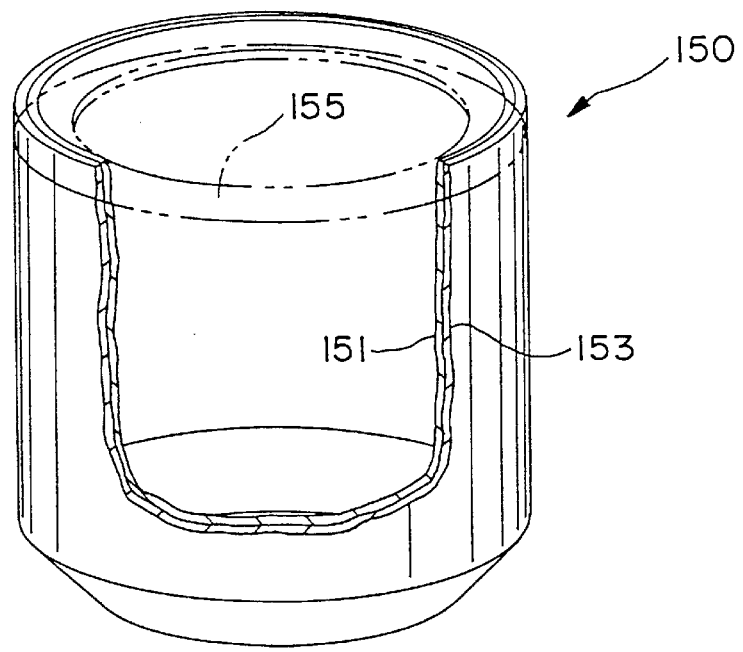
FIG. 13 is an elevated perspective view of an embodiment of the outer sleeve (partially broken away) of the chuck device of the present invention.

Moreover, as shown in FIG. 13 for example, after apron flange 115 is fitted to body member 125, outer sleeve 150 is fitted over body member 125 and apron flange 115. Then the free edge portion (denoted in dashed line in FIGS. 10 and 13) of the lower portion of shroud portion 156 of outer sleeve 150 is rolled over to form a lip portion 155 as shown in FIGS. 11 and 12 for example. Lip portion 155 provides a rear stop against apron flange 115 to retain body member 125 within outer sleeve 150.

As shown in FIG. 3 for example, an operator can grasp the chuck device 110, 210 about shroud portion 156, 56 of outer sleeve 150, 50 and move outer sleeve 150, 50 axially in the direction of single-head arrow 31. By so doing, the chuck device becomes configured in the release position that permits the shank 23 of a tool to be inserted into or withdrawn from axial bore 132, 32 of inner sleeve 128, 28. In the preferred embodiment of FIGS. 9 and 10, this release position of the chuck device 110 results in cover mounting sleeve 178 being butted against upper end 130 of inner sleeve 128. Cover mounting sleeve 178 thereby moves inner sleeve 128 axially to compress spring mechanism 141. This axial movement of inner sleeve 128 causes tapered exterior surface 133 of upper end 130 of inner sleeve 128 to disengage from tapered interior surface 134 of taper plate 180 in the front end of body member 125. When these two tapered surfaces 133, 134 disengage, the resiliency of the material forming inner sleeve 128 causes the diameter of axial bore 132 of upper end 130 of inner sleeve 128 to expand and so to move radially outward and release (or receive) the shank of any tool being withdrawn therefrom (or inserted therein).

In an alternative embodiment of the chuck, this release position of the chuck device 210 is shown in FIG. 3A for example. Cover mounting sleeve 78 butts against upper end 30 of inner sleeve 28 and thereby moves inner sleeve 28 axially to compress spring mechanism 41. This axial movement of inner sleeve 28 into the release position allows retractable gripping elements 37, 87 to recede into respective tapered annular pockets 24, 26 disposed in body member 25. In this orientation, the shank 23 of a tool can be quickly inserted into or withdrawn from chuck 210, as indicated schematically by the double-head arrow 42 depicted in FIGS. 3 and 3A.

In the alternative embodiment of FIGS. 15 and 17 for example, the static tool shank holding means is forced into the release position by manually moving first throw-weight portion 366 of first cam member 360 toward second throw-weight portion 376 of second cam member 370. This can be accomplished by placing the operator's thumb on one (366 or 376) and the operator's forefinger or middle finger on the other (376 or 366) and squeezing the operator's two opposed fingers toward each other until cam members 360, 370 are oriented as shown in FIG. 15.

As shown in FIG. 17, one end of inner sleeve 328 and one end of retainer sleeve 380 is beveled to form an inclined cam follower surface 347. As shown in FIGS. 16 and 17, first cam member 360 is provided with a flat outer cam surface 348 that is bounded at one end by a transversely disposed step surface 349. Similarly, as shown in FIG. 17, second cam member 370 is provided with a flat outer cam surface 348 that is bounded at one end by a transversely disposed step surface 349. As cam members 360, 370 move toward one another within transverse opening 322 of body member 325, each respective step surface 349 eventually engages its corresponding cam follower surface 347 and causes inner sleeve 328 to move axially against the biasing force of spring mechanism 341 while simultaneously causing retainer sleeve 380 to move axially against the biasing force of auxiliary spring mechanism 343.

Figure 18:
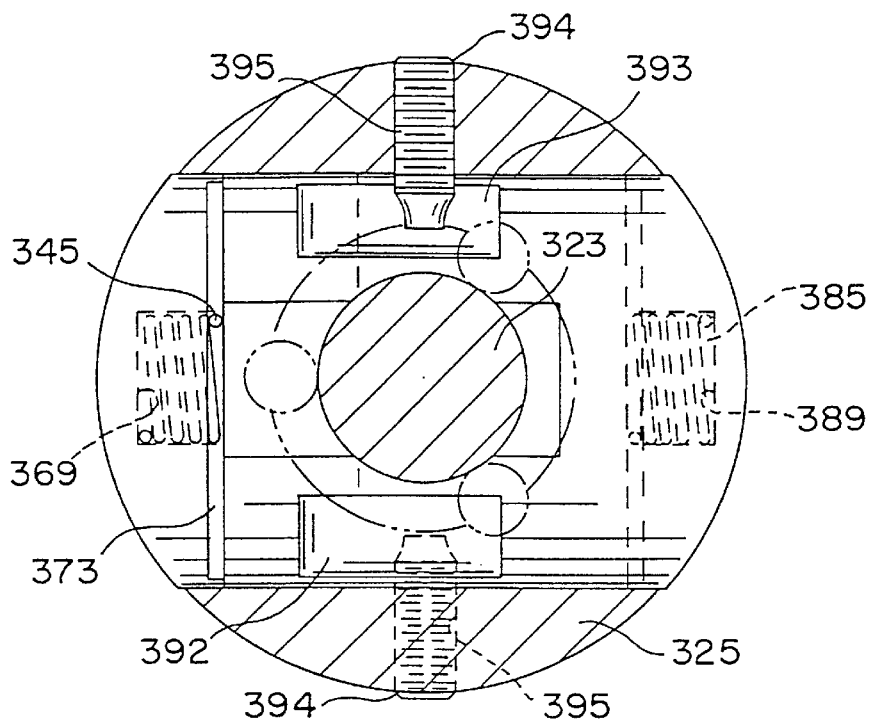
FIG. 18 is a cross-sectional view of components of the device of FIG. 15 in the engaged position and taken along the line of sight indicated by arrows designated 18—18 in FIG. 15.
Figure 19:
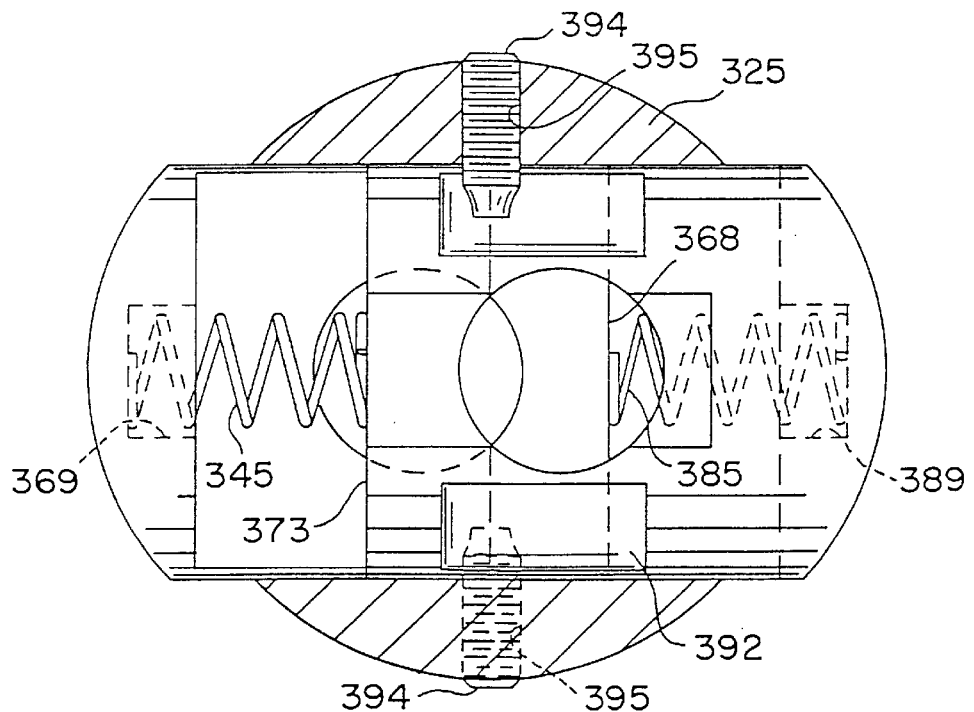
FIG. 19 is a cross-sectional view similar to the one of FIG. 18, but without the tool shank inserted into the chuck, which is shown in the unengaged position.

In the embodiment of FIGS. 15–19, a means is provided for biasing the static tool shank holding means in the engaged position. As shown in FIGS. 15–19, a first transverse spring mechanism 345 and a second transverse spring mechanism 385 are disposed between first and second cam members 360, 370 so as to bias the static tool shank holding means in the engaged position. As shown in FIGS. 17–19 for example, one end of first transverse spring 345 is received in a spring recess 369 formed in first cam member 360 and presses against the free end 73 of second finger 371 of second cam member 370. Similarly, one end of second transverse spring 385 is received in a spring recess 389 formed in second cam member 370 and presses against the free end 368 of first finger 361 of first cam member 360. The transverse springs 345, 385 are shown in their compressed states in FIG. 18 and in their uncompressed states in FIG. 19.

In the embodiment of FIGS. 15–19, a further means is provided for retaining the cam members at least partially within the transverse opening of the body member. This is accomplished by elongated grooves 392, 393 formed respectively in the first and second fingers 361, 371 of the first and second cam members 360, 370, set screws 394 threaded through threaded holes 395 bored transversely through body member 325 to enable set screws 394 to protrude into grooves 392, 393, and stop flanges 396, 397 configured respectively on the free ends of first and second fingers 361, 371 of the first and second cam members 360, 370 so as to interlock with one another when the cam members 360, 370 should separate from each other by a predetermined distance.

Figure 14:
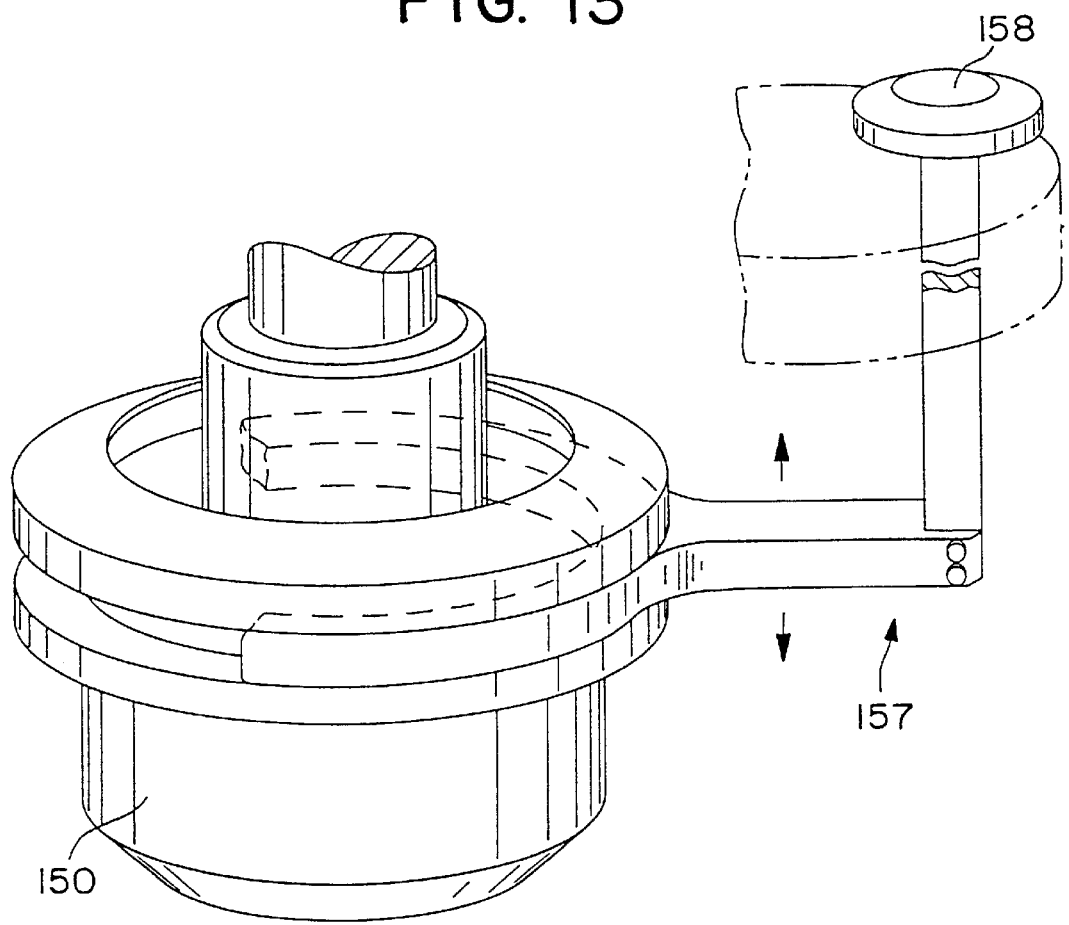
FIG. 14 is an elevated perspective view of another embodiment of the outer sleeve of the chuck device of the present invention.

In a preferred embodiment schematically shown in FIG. 14 for example, a remote actuating member 157 is provided with one end connected to the outer sleeve 150. This can be accomplished in any conventional manner, such as by the wishbone flange wedged between top and bottom washers formed on or press-fitted to outer shell 153 of outer sleeve 150 shown in FIG. 14. Remote actuating member 157 is further configured so that movement of the remote end of the remote actuating member 157 effects axial movement of the outer sleeve 150. This too can be accomplished in any conventional manner, such as by the jointed linkage terminating in the button 158 mounted on the machine tool (schematically indicated in dashed line in FIG. 14). In appropriate tool applications, the linkage can be direct and/or unjointed rather than indirect and/or jointed. Movement of button 158 at the remote end causes the inner sleeve 128 to move axially and thereby permits retraction of the inner sleeve 128 to its release position to insert or withdraw the tool shank from the axial bore 132 of the inner sleeve 128.

Figure 8A:
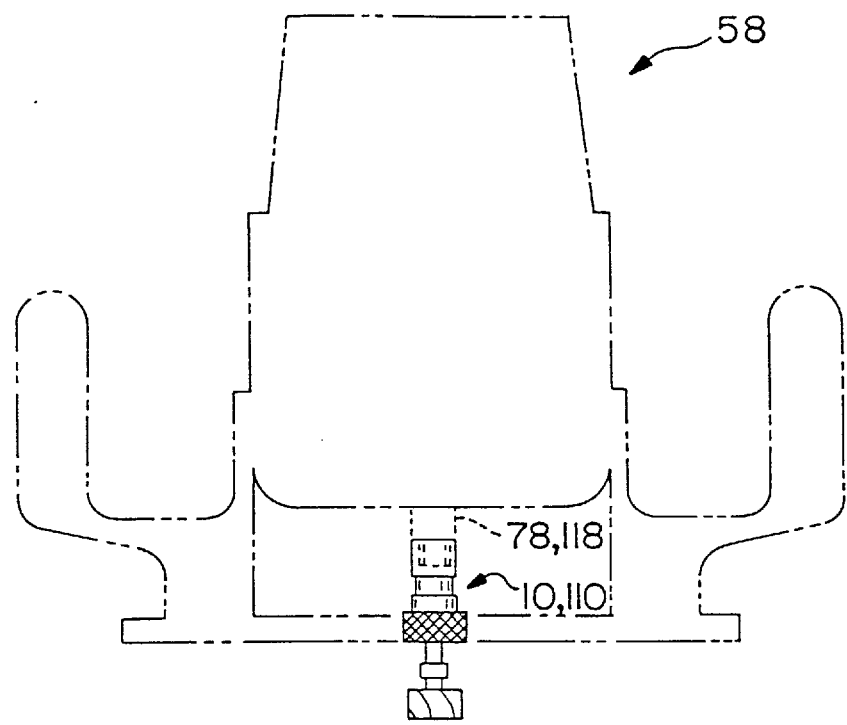
FIGS. 8A and 8B are diagrammatic views of a machine tool, such as a router, incorporating the quick-change chuck device according to the invention.
Figure 8B:
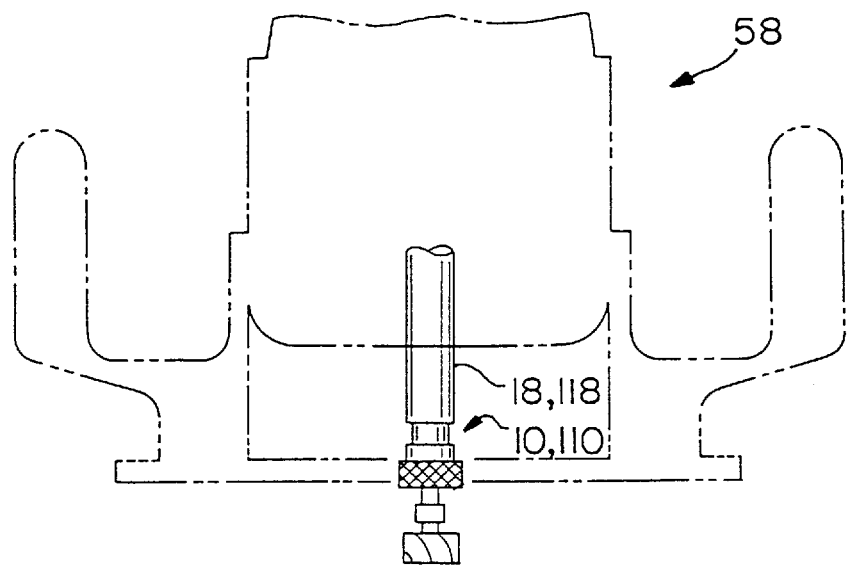

The present invention also encompasses any conventional machine tool configured for driving a tool bit which utilizes the quick-change chuck device discussed above. For example, referring to FIGS. 8A and 8B, a conventional machine tool 58 is illustrated in diagrammatic form. Machine tool 58 may comprise a router, such as illustrated, or any manner of machine tool such as a laminate trimmer, or any machine tool wherein it is desired to utilize a quick-change chuck device 210 as described above. In the embodiment of FIG. 8A, device 210 is mated with drive spindle 18 of tool 58 through an appropriate locking device 59, such as the threaded engagement devices or socket devices discussed above. In the embodiment of FIG. 8B, device 210 is formed integral with drive spindle 18.

The present invention is suited for any manner of machine tool wherein a tool bit must be rotationally driven. The device is particularly suited for applications such as routers and laminate trimmers wherein relatively great rotational speeds are desired. However, this is in no means a limitation of the invention. In fact, it will be apparent to those skilled in the art that various modifications and variations can be made in the apparatus of the present invention without departing from the scope or spirit of the present invention.

While a preferred embodiment of the invention has been described using specific terms, such description is for illustrative purposes only, and it is to be understood that changes and variations may be made without departing from the spirit or scope of the following claims. Thus, it is intended that the present invention cover the modifications and variations of this invention provided they come within the scope of the appended claims and their equivalents.

What is claimed is:

1. A quick-change chuck device, comprising:

a body member having an axial recess defined therein, said body member further comprising a transverse opening disposed across said axial recess;

a first cam member defining at least a first finger at a first end thereof, said first finger being configured to pass through said transverse opening of said body member, said first finger defining a first passage configured concentrically with said axial recess of said body member during at least a first disposition of said first finger at least partially within said transverse opening of said body member;

a second cam member defining at least a second finger at a first end thereof, said second finger being configured to pass through said transverse opening of said body member, said second finger defining a second passage configured concentrically with said axial recess of said body member during at least a second disposition of said second finger at least partially within said transverse opening of said body member;

an inner sleeve member disposed axially and at least partially within said axial recess of said body member and said first and second passages, said inner sleeve member defining an elongated bore in the axial direction; and wherein said inner sleeve defines a tapered outer surface and said passages of said first and second cams define tapered inner surfaces disposed in opposition to said tapered outer surface of said inner sleeve.

2. The device as in claim 1, further comprising an outer sleeve configured and disposed about said body member.

3. The device as in claim 2, further comprising:

a remote actuating member having one end connected to said outer sleeve for effecting axial movement of said outer sleeve.

4. The device as in claim 2, wherein said outer sleeve includes an inner shell and an outer shell conforming to and overlying the exterior surface of said inner shell.

5. The device as in claim 4, wherein said outer shell is formed of plastic comolded to said inner shell.

6. The device as in claim 1, wherein said inner sleeve member having a lower end and an upper end disposed opposite said lower end, said inner sleeve further defining at least a first axially extending slit therethrough, said first slit extending from one of said upper end and said lower end toward the other of said upper end and said lower end.

7. The device as in claim 6, wherein said inner sleeve further defining at least a second axially extending slit therethrough, said second slit extending from said lower end toward said upper end and spaced apart from said first slit.

8. The device as in claim 6, wherein said upper end of said inner sleeve member having a free edge and an exterior surface, said exterior surface of said upper end of said inner sleeve being shaped to taper axially toward said free edge of said upper end of said inner sleeve.

9. The device as in claim 8, further comprising:

a retainer sleeve defining an inner channel disposed about said upper end of said inner sleeve and generally opposed to said exterior surface of said upper end of said inner sleeve, said inner channel defining an interior surface configured to taper axially with reducing diameter as said interior surface opposed generally to said exterior surface of said upper end of said inner sleeve approaches said free edge of said upper end.

10. The device as in claim 9, wherein said first cam member defines a first throw-weight portion at a second end opposite to said first end of said first cam member; and said second cam member defining a second throw-weight portion at a second end opposite to said first end of said second cam member, said second finger being configured to interfit with said first finger when both said first and second fingers are disposed in said transverse opening to align said first and second passages with said axial recess of said body member.

11. The device as in claim 10, further comprising:

an axial spring mechanism disposed relative to said inner sleeve member and said body member so as to bias said inner sleeve member axially relative to said body member to a biased position, said inner sleeve member being axially movable against the biasing force of said spring mechanism to a released position;

a second tapered annular pocket disposed in said body member to the other side of said transverse opening and communicating with said axial recess, said second tapered annular pocket being configured to taper in a manner becoming increasingly deep upon approaching closer to said transverse opening;

at least a second retractable gripping element, said second gripping element being confined by said at least second collar opening and said second tapered annular pocket; and wherein said retainer sleeve is disposed relative to said inner sleeve member and said spring mechanism so as to be biased axially relative to said body member to a biased position, said retainer sleeve being axially movable against the biasing force of said spring mechanism to a released position, said second gripping element contacting said second collar surface so as to extend radially inward into said channel in said biased position of said cover mounting sleeve, said second gripping element being movable radially outward within said second tapered annular pocket in said released position of said retainer sleeve.

12. The device as in claim 9, further comprising:

an axial spring mechanism disposed relative to said inner sleeve member and said body member so as to bias said inner sleeve member axially relative to said body member to a biased position, said interior surface of said retainer sleeve contacting said exterior surface of said upper end of said inner sleeve so as to compress said upper end radially inward so as to reduce the diameter of said axial bore in said biased position of said inner sleeve, said inner sleeve member being axially movable against the biasing force of said spring mechanism to a released position so as to permit an increase in the diameter of said axial bore in said released position of said inner sleeve relative to said diameter in said biased position, said upper end of said inner sleeve being movable radially outward in said released position of said inner sleeve; and a cover mounting sleeve member defining an interior channel configured concentrically with said axial bore of said inner sleeve, said cover mounting sleeve being disposed relative to said inner sleeve member and said spring mechanism so as to be biased axially relative to said inner sleeve member to a biased position, said cover mounting sleeve being axially movable against the biasing force of said spring mechanism to move said inner sleeve to said released position of said inner sleeve.

13. The device as in claim 1, further comprising:

an axial spring mechanism disposed so as to bias said inner sleeve member axially relative to said body member to a biased position, said inner sleeve member being axially movable against the biasing force of said spring mechanism to a released position.

14. The device as in claim 13, further comprising:

a first tapered annular pocket disposed in said body member to one side of said transverse opening and communicating with said axial recess, said first tapered annular pocket being configured to taper in a manner becoming increasingly shallow upon approaching closer to said transverse opening.

15. The device as in claim 14, wherein said inner sleeve member further defining at least a first collar opening defined by a first collar surface configured to receive a retractable gripping element and permit said gripping element to protrude radially into said axial bore up to a predetermined extent.

16. The device as in claim 15, further comprising:
at least a first retractable gripping element being confined by said at least one collar opening and said first tapered annular pocket, said at least one gripping element contacting said at least one collar surface so as to extend radially inward into said bore in said biased position of said inner sleeve, said gripping element being movable radially outward within said first tapered annular pocket in said released position of said inner sleeve.

17. The device as in claim 1, wherein said first cam member defines a first throw-weight portion at a second end opposite to said first end of said first cam member; and
said second cam member defining a second throw-weight portion at a second end opposite to said first end of said second cam member, said second finger being configured to interfit with said first finger when both said first and second fingers are disposed in said transverse opening to align said first and second passages with said axial recess of said body member.

18. The device as in claim 15, further comprising:
a retainer sleeve defining an inner channel configured concentrically with said bore of said inner sleeve, said retainer sleeve being configured to be disposed at least partially within said axial recess of said body member; and
wherein said retainer sleeve further including at least a second collar opening defined by a second collar surface configured to receive a second retractable gripping element and permit said second gripping element to protrude radially into said inner channel up to a predetermined extent.

19. The device as in claim 18, further comprising:
an axial spring mechanism disposed relative to said inner sleeve member and said body member so as to bias said inner sleeve member axially relative to said body member to a biased position, said inner sleeve member being axially movable against the biasing force of said spring mechanism to a released position;
a second tapered annular pocket disposed in said body member to the other side of said transverse opening and communicating with said axial recess, said second tapered annular pocket being configured to taper in a manner becoming increasingly deep upon approaching closer to said transverse opening;
at least a second retractable gripping element, said second gripping element being confined by said at least second collar opening and said second tapered annular pocket; and
wherein said retainer sleeve is disposed relative to said inner sleeve member and said spring mechanism so as to be biased axially relative to said body member to a biased position, said retainer sleeve being axially movable against the biasing force of said spring mechanism to a released position, said second gripping element contacting said second collar surface so as to extend radially inward into said inner channel in said biased position of said retainer sleeve, said second gripping element being movable radially outward within said second tapered annular pocket in said released position of said retainer sleeve.

20. The device as in claim 1, further comprising:
a cover mounting sleeve defining an interior channel configured concentrically with said axial bore of said inner sleeve, said cover mounting sleeve being configured to be disposed at least partially within said axial recess of said body member; and
an outer sleeve configured and disposed about said body member, wherein said outer sleeve includes a cap portion, said cap portion defining a centrally disposed hole configured to receive said cover mounting sleeve therethrough.

21. The device as in claim 20, wherein said body member defines a radially extending apron flange disposed beneath said transverse opening and defining a circumferentially extending free edge, wherein said cap portion of said outer sleeve member is press-fit to said cover mounting sleeve through said centrally disposed hole, and wherein said outer sleeve defines a shroud portion extending axially from said cap portion and overlapping said free edge of said apron flange.

22. The device as in claim 1, further comprising an engagement mechanism for operably connecting the device to a drive spindle.

23. The device as in claim 22, wherein said engagement mechanism includes a female threaded receiving portion at an end of said body member for threaded engagement with a male threaded driving spindle.

24. The device as in claim 22, wherein said engagement mechanism includes a male threaded engaging portion at an end of said body member for threaded engagement with a female threaded receiving portion of a driving spindle.

25. The device as in claim 22, wherein said engagement mechanism includes a female unthreaded receiving portion at an end of said body member and configured for engagement with a male tapered mount at the end of a driving spindle.

26. The device as in claim 22, wherein said engagement mechanism includes a mounting mechanism for facilitating automated attachment of said body member to a driving spindle of a machine tool.

27. The device as in claim 26, wherein said mounting mechanism includes at least one opening configured to receive one of the group consisting of a torx head tool, an Allen head tool, and a square head tool.

28. A quick-change chuck device for holding the shank of a tool used in relatively high rpm applications, comprising:
a body member having an axial recess defined therein, said axial recess being symmetrically disposed about a central longitudinal axis, said body member further defining therethrough a transverse opening disposed across said axial recess and intersecting the central longitudinal axis;
at least one transverse locking member disposed in said transverse opening and configured to lock the tool shank within said recess in an operational rotating mode of said chuck device;
a static tool shank holding mechanism disposed at least partially within said axial recess and longitudinally remote from said transverse opening, said static tool shank holding mechanism being configured to retain the tool shank within said axial recess in a static mode of the device; and
an engagement mechanism for operably connecting the device to a drive spindle.

29. The device as in claim 28, wherein said engagement mechanism includes a female threaded receiving portion at an end of said body member for threaded engagement with a male threaded driving spindle.

30. The device as in claim 28, wherein said engagement mechanism includes a male threaded engaging portion at an end of said body member for threaded engagement with a female threaded receiving portion of a driving spindle.

31. The device as in claim 28, wherein said engagement mechanism includes a female unthreaded receiving portion at an end of said body member and configured for engagement with a male tapered mount at the end of a driving spindle.

32. The device as in claim 28, wherein said engagement mechanism includes a mounting mechanism for facilitating automated attachment of said body member to a driving spindle of a machine tool.

33. The device as in claim 32, wherein said mounting mechanism includes at least one opening configured to receive one of the group consisting of a torx head tool, an Allen head tool, and a square head tool.

34. A quick-change chuck device, comprising:

a body member having an axial recess defined therein for receipt of an inner sleeve member, said body member further comprising a transverse opening disposed transversely relative to said axial recess;

a cylindrical inner sleeve member having opposed lower and upper ends, said inner sleeve member being disposed coaxially and at least partially within said axial recess of said body member and axially movable relative to said body member, said inner sleeve member defining an inner axially extending bore, said inner sleeve member further defining at said lower end thereof at least a first collar opening defined by a first collar surface configured to receive a retractable gripping element and permit said gripping element to protrude radially into said bore up to a predetermined extent, said inner sleeve further defining at least a first axially extending slit therethrough, said slit extending from said upper end toward said at least one collar opening, said inner sleeve further defining at least a second axially extending slit therethrough, said second slit extending from said lower end toward said upper end and parallel to said first slit;

an axial spring mechanism disposed relative to said inner sleeve member and said body member so as to bias said inner sleeve member axially relative to said body member to a biased position, said inner sleeve member being axially movable against the biasing force of said spring mechanism to a released position;

a first tapered annular pocket disposed in said body member beneath said transverse opening and communicating with said axial recess, said first tapered annular pocket being configured to taper in a manner becoming increasingly shallow upon approaching closer to said transverse opening;

a second tapered annular pocket disposed in said body member above said transverse opening and communicating with said axial recess, said second tapered annular pocket being configured to taper in a manner becoming increasingly deep upon approaching closer to said transverse opening;

at least a first retractable gripping element being confined by said at least one collar opening and said first tapered annular pocket, said at least one gripping element contacting said at least one collar surface and thereby being forced radially inward within said collar opening so as to extend into said bore in biased position of said inner sleeve, said gripping element being movable radially outward within said first tapered annular pocket in said released position of said inner sleeve;

a first cam member defining at least a first finger at a first end thereof and a first throw-weight portion at a second end opposite to said first end of said first cam member, said first finger being configured to pass through said transverse opening of said body member, said first finger defining a first passage configured concentrically with and about said axial recess of said body member during at least a first predetermined disposition of said first finger within said transverse opening of said body member;

a second cam member defining at least a second finger at a first end thereof and a second throw-weight portion at a second end opposite to said first end of said second cam member, said second finger being configured to pass through said transverse opening of said body member, said second finger defining a second passage configured concentrically with and about said axial recess of said body member during at least a predetermined disposition of said second finger within said transverse opening of said body member, said second finger being configured to interfit with said first finger when both said first and second fingers are disposed in said transverse opening to align said first and second passages with said axial recess of said body member;

a cover mounting sleeve defining an inner channel configured concentrically with said bore of said inner sleeve, said cover mounting sleeve being configured to be disposed at least partially within said axial recess of said body member; and an outer sleeve defining a cap portion, said cap portion defining a centrally disposed hole configured to receive said cover mounting sleeve therethrough, said outer sleeve being configured and disposed about said body member.

35. A machine tool configured for driving a tool bit, said machine tool comprising:

a drivable spindle; and a quick-change chuck device, said chuck device further comprising:

a body member having an axial recess defined therein, said body member further comprising a transverse opening disposed across said axial recess, a first cam member defining at least a first finger at a first end thereof, said first finger being configured to pass through said transverse opening of said body member, said first finger defining a first passage configured concentrically with said axial recess of said body member during at least a first disposition of said first finger at least partially within said transverse opening of said body member, a second cam member defining at least a second finger at a first end thereof, said second finger being configured to pass through said transverse opening of said body member, said second finger defining a second passage configured concentrically with said axial recess of said body member during at least a second disposition of said second finger at least partially within said transverse opening of said body member; and a static tool shank holding mechanism disposed at least partially within said axial recess and configured to releasably grip the tool shank within said axial recess separately from said cam members in a static mode of said device.

\* \* \* \* \*